(12) United States Patent
Wu et al.

(10) Patent No.: US 10,397,901 B2
(45) Date of Patent: Aug. 27, 2019

(54) RESOURCE ALLOCATION METHOD, ACCESS POINT, AND STATION

(71) Applicant: HUAWEI TECHNOLOGIES CO., LTD., Shenzhen (CN)

(72) Inventors: Weimin Wu, Wuhan (CN); Jun Lou, Shanghai (CN); Shanshan Gong, Wuhan (CN); Xun Yang, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/443,373

(22) Filed: Feb. 27, 2017

(65) Prior Publication Data

US 2017/0171838 A1 Jun. 15, 2017

Related U.S. Application Data

(63) Continuation of application No. PCT/CN2014/085474, filed on Aug. 29, 2014.

(51) Int. Cl.
*H04W 72/04* (2009.01)
*H04L 1/16* (2006.01)
(Continued)

(52) U.S. Cl.
CPC .......... *H04W 72/04* (2013.01); *H04L 1/1614* (2013.01); *H04W 72/042* (2013.01); *H04L 5/003* (2013.01);
(Continued)

(58) Field of Classification Search
None
See application file for complete search history.

(56) References Cited

U.S. PATENT DOCUMENTS 5,249,304 A * 9/1993 Mulford ............... H04W 84/08
455/512
7,400,901 B2 * 7/2008 Kostic ..................... H04L 47/10
370/236
(Continued)

FOREIGN PATENT DOCUMENTS

CN 102013959 A 4/2011
CN 102948091 A 2/2013
(Continued)

OTHER PUBLICATIONS

International Search Report dated Jun. 5, 2015 in corresponding International Application No. PCT/CN2014/085474.
(Continued)

*Primary Examiner* — Jamaal Henson
(74) *Attorney, Agent, or Firm* — Staas & Halsey LLP

(57) ABSTRACT

The present application provide a resource allocation method, an access point, and a station. The method includes: determining a resource allocation sequence of N stations in a wireless local area network and a position of a resource allocated to each station in the N stations; determining resource allocation information according to the resource allocation sequence of the N stations and the position of the resource allocated to each station in the N stations, where the resource allocation information is used to reflect a relative position of the resource allocated to each station in the N stations; and sending resource indication information, so that each station in the N stations obtains, according to the resource indication information, the position of the resource allocated to each station. The method utilizes redundancy between indication information of different stations, so signaling overheads of resource indication information can be reduced.

12 Claims, 7 Drawing Sheets

(51) Int. Cl.
*H04W 88/08* (2009.01)
*H04L 5/00* (2006.01)
*H04W 84/12* (2009.01)

(52) U.S. Cl.
CPC .......... *H04L 5/0007* (2013.01); *H04W 84/12* (2013.01); *H04W 88/08* (2013.01)

(56) References Cited

U.S. PATENT DOCUMENTS

| | | | |
|---|---|---|---|
| 8,897,253 B2 | 11/2014 | Shin et al. | |
| 9,060,359 B2 | 6/2015 | Kim et al. | |
| 9,326,154 B2 | 4/2016 | Abe et al. | |
| 2007/0230412 A1* | 10/2007 | McBeath | H04W 72/1289 370/338 |
| 2007/0253421 A1* | 11/2007 | Cai | H04J 3/247 370/394 |
| 2007/0274288 A1* | 11/2007 | Smith | H04L 5/0092 370/351 |
| 2008/0043650 A1* | 2/2008 | Jang | H04W 72/0453 370/310 |
| 2009/0149188 A1* | 6/2009 | McBeath | H04W 72/04 455/450 |
| 2010/0067465 A1* | 3/2010 | Miki | H04L 5/0007 370/329 |
| 2012/0023235 A1* | 1/2012 | Hole | H04W 72/1268 709/226 |
| 2013/0003672 A1* | 1/2013 | Dinan | H04L 1/00 370/329 |

FOREIGN PATENT DOCUMENTS

| | | |
|---|---|---|
| CN | 103096492 A | 5/2013 |
| CN | 103370958 A | 10/2013 |
| CN | 103733560 A | 4/2014 |
| KR | 20090039594 A | 4/2009 |

OTHER PUBLICATIONS

International Search Report dated Jun. 5, 2015, in corresponding to International Application PCT/CN2014/085474.
Chinese Office Action for Chinese Application No. 201480081184.7 dated Mar. 5, 2019.
Chinese Search Report for Chinese Application No. 201480081184.7 dated Feb. 26, 2019.

* cited by examiner

RESOURCE ALLOCATION METHOD, ACCESS POINT, AND STATION

CROSS-REFERENCE TO RELATED APPLICATIONS

This application is a continuation of international application No. PCT/CN2014/085474, filed on Aug. 29, 2014, the disclosure of which is hereby incorporated by reference in its entirety.

TECHNICAL FIELD

The present application relates to the field of wireless communications technologies, and more specifically, to a resource allocation method in a wireless local area network, an access point, and a station.

BACKGROUND

With development of mobile Internet and popularity of intelligent terminals, data traffic increases rapidly. A wireless local area network (WLAN) has become one of mainstream mobile broadband access technologies due to advantages of high rate and low costs.

In an existing wireless local area network system, a station sends and receives data by using a contention mechanism. When the station obtains a resource by means of contention, other stations cannot send or receive data, thereby causing resource wastes. To ensure high resource usage, a scheduling-based transmission mode is used in an existing orthogonal frequency division multiple access (OFDMA) system. In this mode, the station does not need to contend for a channel to obtain a transmission opportunity; instead, an access point allocates a physical time frequency resource, and indicates to each station independently. For example, in the existing OFDMA system, a channel resource is divided into multiple resource blocks, and the access point independently indicates to each station according to a start position and an end position of a resource allocated to the station, causing large signaling overheads during resource allocation.

SUMMARY

Embodiments of the present application provide a resource allocation method, an access point, and a station, so as to reduce signaling overheads of resource indication information.

According to a first aspect, an access point is provided, where the access point includes: a first determining unit, configured to determine a resource allocation sequence of N stations in a wireless local area network and a position of a resource allocated to each station in the N stations; a second determining unit, configured to determine resource allocation information according to the resource allocation sequence of the N stations and the position of the resource allocated to each station in the N stations, where the resource allocation information is used to reflect a relative position of the resource allocated to each station in the N stations; and a first sending unit, configured to send resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

With reference to the first aspect, in a first possible implementation manner, a channel resource of the wireless local area network is divided into multiple resource block units, and the second determining unit is configured to: re-number resource block units in the multiple resource block units other than resource block units allocated to the first i−1 stations in the N stations, where $2 \le i \le N$; and determine resource allocation information of the $i^{th}$ station according to numbers of the resource block units in the multiple resource block units other than the resource block units allocated to the first i−1 stations in the N stations and a position of a resource allocated to the $i^{th}$ station.

With reference to the first possible implementation manner, in a second possible implementation manner, the channel resource of the wireless local area network is divided into the multiple resource block units, the resource allocation information of the $i^{th}$ station in the N stations includes a sub-bitmap, and each bit in the sub-bitmap represents whether a resource block unit corresponding to each bit is allocated to the $i^{th}$ station.

With reference to the first possible implementation manner, in a third possible implementation manner, the resource allocation information of the $i^{th}$ station includes a start number of a resource block unit allocated to the $i^{th}$ station in the resource block units in the multiple resource block units other than the resource block units allocated to the first i−1 stations in the N stations and includes an offset relative to the start number.

With reference to any one of the first to the third possible implementation manners, in a fourth possible implementation manner, the first determining unit is configured to determine the resource allocation sequence of the N stations in descending order of quantities of resource block units allocated to the N stations, where a quantity of resource block units allocated to the $(i-1)^{th}$ station in the N stations is greater than or equal to a quantity of the resource block units allocated to the $i^{th}$ station.

With reference to the first possible implementation manner, in a fifth possible implementation manner, the resource allocation information of the $i^{th}$ station includes an offset corresponding to a resource block unit allocated to the $i^{th}$ station in the resource block units in the multiple resource block units other than the resource block units allocated to the first i−1 stations in the N stations.

With reference to any one of the first to the fifth possible implementation manners, in a sixth possible implementation manner, when resource allocation information of the $m^{th}$ station in the N stations has been already determined, and a quantity of resource block units, for which resource indication information is not determined, in the multiple resource block units is N−m, the resource allocation information of the N stations includes resource allocation information corresponding to the first m stations in the N stations, where the resource allocation information of the N stations indicates that one resource block unit is allocated to each station from the $(m+1)^{th}$ station to the $N^{th}$ station in the N stations, and $1 \le m < N$.

With reference to the first aspect, in a seventh possible implementation manner, a channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

With reference to the first aspect, in an eighth possible implementation manner, a channel resource of the wireless local area network is divided into multiple resource block units, and the second determining unit is configured to: determine, according to a resource allocated to the $i^{th}$ station in the N stations, a bandwidth of the resource allocated to the $i^{th}$ station in the N stations; and determine resource allocation information according to the bandwidth of the resource allocated to the $i^{th}$ station in the N stations and a sequential position of the $i^{th}$ station in the N stations, where the resource allocation information includes the bandwidth of the resource allocated to the $i^{th}$ station and the sequential position of the $i^{th}$ station in the N stations, and the bandwidth of the resource allocated to the $i^{th}$ station in the N stations is a quantity of resource block units allocated to the $i^{th}$ station in the N stations.

With reference to the eighth possible implementation manner, in a ninth possible implementation manner, the second determining unit is configured to obtain a start position or an end position of resources allocated to the N stations, where the resource allocation information further includes the start position or the end position.

With reference to the eighth or the ninth possible implementation manner, in a tenth possible implementation manner, when quantities of resource block units allocated to the N stations are equal, bandwidths of the resources allocated to the N stations are represented by using one numerical value, where the numerical value represents a quantity of resource block units allocated to each station in the N stations, and the resource allocation information includes the sequential position of the $i^{th}$ station in the N stations and the numerical value.

With reference to any one of the first to the tenth possible implementation manners, in an eleventh possible implementation manner, the access point further includes a second sending unit, configured to send resource block unit information to the $i^{th}$ station, where the resource block unit information indicates a size of a resource block unit.

With reference to the eleventh possible implementation manner, in a twelfth possible implementation manner, the second sending unit is configured to send the resource block unit information by using one of a management frame, a data frame, or a control frame.

With reference to the first aspect, in a thirteenth possible implementation manner, the second determining unit is configured to: determine, according to the position of the resource allocated to each station in the N stations, a start position of a resource allocated to the $i^{th}$ station in the N stations; and determine the resource allocation information according to the start position of the resource allocated to the $i^{th}$ station in the N stations and a sequential position of the $i^{th}$ station in the resource allocation sequence of the N stations, where the resource allocation information includes the start position of the resource allocated to the $i^{th}$ station and the sequential position of the $i^{th}$ station in the resource allocation sequence of the N stations; or the second determining unit is configured to: determine, according to the position of the resource allocated to each station in the N stations, an end position of a resource allocated to the $i^{th}$ station in the N stations; and determine the resource allocation information according to the end position of the resource allocated to the $i^{th}$ station in the N stations and a sequential position of the $i^{th}$ station in the resource allocation sequence of the N stations, where the resource allocation information includes the end position of the resource allocated to the $i^{th}$ station and the sequential position of the $i^{th}$ station in the resource allocation sequence of the N stations.

With reference to any one of the first aspect, or the first to the thirteenth possible implementation manners, in a fourteenth possible implementation manner, the first sending unit is configured to send a data frame to the $i^{th}$ station in the N stations, where the data frame carries the resource indication information.

According to a second aspect, a station is provided, where the station includes: a first receiving unit, configured to receive resource indication information sent by an access point, where the resource indication information is used to indicate a resource allocation sequence of N stations and resource allocation information, the resource allocation information is used to reflect a relative position of a resource allocated to each station in the N stations, and N is greater than or equal to 2; and a determining unit, configured to determine, according to the resource indication information, a position of a resource allocated to the station.

With reference to the second aspect, in a first possible implementation manner, a channel resource of a wireless local area network is divided into multiple resource block units, and resource allocation information of the station is used to instruct the station to obtain, according to the resource allocation information of the station, a position of a resource block unit allocated to the station, and the determining unit is configured to determine, according to the resource allocation information of the station, the position of the resource block unit allocated to the station.

With reference to the first possible implementation manner of the second aspect, in a second possible implementation manner, the resource allocation information includes a sub-bitmap, and each bit in the sub-bitmap represents whether a resource block unit corresponding to each bit is allocated to the station corresponding to the sub-bitmap, and the determining unit is configured to determine, according to the sub-bitmap of the station, the position of the resource block unit allocated to the station.

With reference to the second aspect, in a third possible implementation manner, a channel resource of a wireless local area network is divided into multiple resource block units, and the resource allocation information includes a quantity of resource block units allocated to the station and a sequential position of the station in the resource allocation sequence of the N stations, and the determining unit is configured to: determine, according to the resource indication information, the sequential position of the station in the resource allocation sequence of the N stations, the quantity of the resource block units allocated to the station, and a quantity of resource block units allocated to a station before the station in the N stations; and determine, according to the quantity of the resource block units allocated to the station before the station in the N stations and the quantity of the resource block units allocated to the station, a position of the resource block unit allocated to the station.

With reference to the second aspect, in a fourth possible implementation manner, a channel resource of a wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations, and the determining unit is configured to determine, according to the sequential position of the station in the resource allocation sequence of the N stations and the bitmap, a position of a resource block unit allocated to the station.

With reference to any one of the first to the fourth possible implementation manners of the second aspect, in a fifth possible implementation manner, the station further includes: a second receiving unit, configured to receive resource block unit information sent by the access point, where the resource block unit information indicates a size of a resource block unit.

With reference to the fifth possible implementation manner of the second aspect, in a sixth possible implementation manner, the second receiving unit is configured to receive the resource block unit information that is sent by the access point by using one of a management frame, a data frame, or a control frame.

With reference to the second aspect, in a seventh possible implementation manner, the resource allocation information includes a start position of the resource allocated to the station and a sequential position of the station in the resource allocation sequence of the N stations, and the determining unit is configured to: determine, according to the resource indication information, the sequential position of the station in the resource allocation sequence of the N stations, the start position of the resource allocated to the station, and a start position of a resource occupied by a next station of the station; and determine that a resource between the start position of the resource occupied by the next station of the station and the start position of the station is the position of the resource allocated to the station; or the resource indication information includes an end position of the resource allocated to the station and a sequential position of the station in the resource allocation sequence of the N stations, and the determining unit is configured to: determine, according to the resource indication information, the sequential position of the station in the resource allocation sequence of the N stations, the end position of the resource allocated to the station, and an end position of a resource occupied by a preceding station of the station; and determine that a resource between the end position of the resource occupied by the preceding station of the station and the end position of the resource allocated to the station is the position of the resource allocated to the station.

With reference to the second aspect, in an eighth possible implementation manner, the resource allocation information includes an end position of resources allocated to the N stations in a wireless local area network, a bandwidth of the resource allocated to each station in the N stations, and a sequential position of each station in the resource allocation sequence of the N stations, and the determining unit is configured to: determine, according to the resource allocation information, a sequential position of the station in the resource allocation sequence of the N stations, a bandwidth of the resource allocated to the station, the end position of the resources allocated to the N stations in the wireless local area network, and bandwidths of resources allocated to all stations after the station in the N stations; and determine the position of the resource allocated to the station, according to the sequential position of the station in the N stations, the bandwidth of the resource allocated to the station, the end position, and the bandwidths of the resources allocated to all the stations after the station in the N stations; or the resource indication information includes a start position of resources allocated to the N stations in a wireless local area network, a bandwidth of the resource allocated to each station in the N stations, and a sequential position of each station in the resource allocation sequence of the N stations, and the determining unit is configured to: determine, according to the resource allocation information, a sequential position of the station in the resource allocation sequence of the N stations, a bandwidth of the resource allocated to the station, the start position of the resources allocated to the N stations in the wireless local area network, and bandwidths of resources allocated to all stations before the station in the N stations; and determine the position of the resource allocated to the station, according to the sequential position of the station in the N stations, the bandwidth of the resource allocated to the station, the start position, and the bandwidths of the resources allocated to all the stations before the station in the N stations.

With reference to any one of the second aspect, or the first to the eighth possible implementation manners of the second aspect, in a ninth possible implementation manner, the first receiving unit is configured to receive a data frame sent by the access point, where the data frame carries the resource indication information.

According to a third aspect, a resource allocation method in a wireless position area network is provided, including: determining a resource allocation sequence of N stations in the wireless local area network and a position of a resource allocated to each station in the N stations; determining resource allocation information according to the resource allocation sequence of the N stations and the position of the resource allocated to each station in the N stations, where the resource allocation information is used to reflect a relative position of the resource allocated to each station in the N stations; and sending resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

With reference to the third aspect, in a first possible implementation manner, a channel resource of the wireless local area network is divided into multiple resource block units, and the determining resource allocation information according to the resource allocation sequence of the N stations and the position of the resource allocated to each station in the N stations includes: re-numbering resource block units in the multiple resource block units other than resource block units allocated to the first i−1 stations in the N stations, where 2≤i<N; and determining resource allocation information of the $i^{th}$ station according to numbers of the resource block units in the multiple resource block units other than the resource block units allocated to the first i−1 stations in the N stations and a position of a resource allocated to the $i^{th}$ station.

With reference to the first possible implementation manner of the third aspect, in a second possible implementation manner, the resource allocation information of the $i^{th}$ station in the N stations includes a sub-bitmap, and each bit in the sub-bitmap represents whether a resource block unit corresponding to each bit is allocated to the $i^{th}$ station.

With reference to the first possible implementation manner of the third aspect, in a third possible implementation manner, the resource allocation information of the $i^{th}$ station includes a start number of a resource block unit allocated to the $i^{th}$ station in the resource block units in the multiple resource block units other than the resource block units allocated to the first i−1 stations in the N stations and includes an offset relative to the start number.

With reference to any one of the first to the third possible implementation manners of the third aspect, in a fourth possible implementation manner, the determining a resource allocation sequence of N stations in the wireless local area network includes: determining the resource allocation sequence of the N stations in descending order of quantities of resource block units allocated to the N stations, where a quantity of resource block units allocated to the $(i-1)^{th}$ station in the N stations is greater than or equal to a quantity of resource block units allocated to the $i^{th}$ station.

With reference to the first possible implementation manner of the third aspect, in a fifth possible implementation manner, the resource allocation information of the $i^{th}$ station includes an offset corresponding to a resource block unit allocated to the $i^{th}$ station in the resource block units in the multiple resource block units other than the resource block units allocated to the first i−1 stations in the N stations.

With reference to any one of the first to the fifth possible implementation manners of the third aspect, in a sixth possible implementation manner, when resource allocation information of the $m^{th}$ station in the N stations has been already determined, and a quantity of resource block units, for which resource indication information is not determined, in the multiple resource block units is N−m, the resource allocation information of the N stations includes resource allocation information corresponding to the first m stations in the N stations, where the resource allocation information of the N stations indicates that one resource block unit is allocated to each station from the $(m+1)^{th}$ station to the $N^{th}$ station in the N stations, and 1≤m<N.

With reference to the third aspect, in a seventh possible implementation manner, a channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

With reference to the third aspect, in an eighth possible implementation manner, a channel resource of the wireless local area network is divided into multiple resource block units, and the determining resource allocation information according to the resource allocation sequence of the N stations and the position of the resource allocated to each station in the N stations includes: determining, according to a position of a resource allocated to the $i^{th}$ station in the N stations, a bandwidth of the resource allocated to the $i^{th}$ station in the N stations; and determining the resource allocation information according to the bandwidth of the resource allocated to the $i^{th}$ station in the N stations and a sequential position of the $i^{th}$ station in the N stations, where the resource allocation information includes the bandwidth of the resource allocated to the $i^{th}$ station and the sequential position of the $i^{th}$ station in the N stations, and the bandwidth of the resource allocated to the $i^{th}$ station in the N stations is a quantity of resource block units allocated to the $i^{th}$ station in the N stations.

With reference to the eighth possible implementation manner of the third aspect, in a ninth possible implementation manner, the determining resource allocation information according to the resource allocation sequence of the N stations and the position of the resource allocated to each station in the N stations includes: obtaining a start position or an end position of resources allocated to the N stations, where the resource allocation information further includes the start position or the end position.

With reference to the eighth or the ninth possible implementation manner of the third aspect, in a tenth possible implementation manner, when quantities of resource block units allocated to the N stations are equal, bandwidths of the resources allocated to the N stations are represented by using one numerical value, where the numerical value represents a quantity of resource block units allocated to each station in the N stations, and the resource allocation information includes the sequential position of the $i^{th}$ station in the N stations and the numerical value.

With reference to any one of the first to the tenth possible implementation manners of the third aspect, in an eleventh possible implementation manner, the method further includes: sending resource block unit information to the $i^{th}$ station, where the resource block unit information indicates a size of a resource block unit.

With reference to the eleventh possible implementation manner of the third aspect, in a twelfth possible implementation manner, the resource block unit information is sent by using one of a management frame, a data frame, or a control frame.

With reference to the third aspect, in a thirteenth possible implementation manner, the determining resource allocation information according to the resource allocation sequence of the N stations and the position of the resource allocated to each station in the N stations includes: determining, according to the position of the resource allocated to each station in the N stations, a start position of a resource allocated to the $i^{th}$ station in the N stations; and determining the resource allocation information according to the start position of the resource allocated to the $i^{th}$ station in the N stations and a sequential position of the $i^{th}$ station in the resource allocation sequence of the N stations, where the resource allocation information includes the start position of the resource allocated to the $i^{th}$ station and the sequential position of the $i^{th}$ station in the resource allocation sequence of the N stations; or the determining resource allocation information according to the resource allocation sequence of the N stations and the position of the resource allocated to each station in the N stations includes: determining, according to the position of the resource allocated to each station in the N stations, an end position of a resource allocated to the $i^{th}$ station in the N stations; and determining the resource allocation information according to the end position of the resource allocated to the $i^{th}$ station in the N stations and a sequential position of the $i^{th}$ station in the resource allocation sequence of the N stations, where the resource allocation information includes the end position of the resource allocated to the $i^{th}$ station and the sequential position of the $i^{th}$ station in the resource allocation sequence of the N stations.

With reference to any one of the third aspect, or the first to the thirteenth possible implementation manners of the third aspect, in a fourteenth possible implementation manner, the sending resource indication information includes: sending a data frame to the $i^{th}$ station in the N stations, where the data frame carries the resource indication information.

According to a fourth aspect, a resource allocation method in a wireless local area network is provided, including: receiving, by a station, resource indication information sent by an access point, where the resource indication information is used to indicate a resource allocation sequence of N stations and resource allocation information, the resource allocation information is used to reflect a relative position of a resource allocated to each station in the N stations, and N is greater than or equal to 2; and determining, by the station according to the resource indication information, a position of a resource allocated to the station.

With reference to the fourth aspect, in a first possible implementation manner, a channel resource of the wireless local area network is divided into multiple resource block units, and resource allocation information of the station is used to instruct the station to obtain, according to the resource allocation information of the station, a position of a resource block unit allocated to the station, and the determining, by the station according to the resource indication information, a position of a resource allocated to the station includes: determining, by the station according to the resource allocation information of the station, the position of the resource block unit allocated to the station.

With reference to the first possible implementation manner of the fourth aspect, in a second possible implementation manner, the resource allocation information includes a sub-bitmap, and each bit in the sub-bitmap represents whether a resource block unit corresponding to each bit is allocated to the station corresponding to the sub-bitmap, and the determining, by the station according to the resource indication information, a position of a resource allocated to the station includes: determining, by the station according to the sub-bitmap of the station, the position of the resource block unit allocated to the station.

With reference to the fourth aspect, in a third possible implementation manner, a channel resource of the wireless local area network is divided into multiple resource block units, and the resource allocation information includes a quantity of resource block units allocated to the station and a sequential position of the station in the resource allocation sequence of the N stations, and the determining, by the station according to the resource indication information, a position of a resource allocated to the station includes: determining, by the station according to the resource indication information, the sequential position of the station in the resource allocation sequence of the N stations, the quantity of the resource block units allocated to the station, and a quantity of resource block units allocated to a station before the station in the N stations; and determining, by the station according to the quantity of the resource block units allocated to the station before the station in the N stations and the quantity of the resource block units allocated to the station, a position of the resource block unit allocated to the station.

With reference to the fourth aspect, in a fourth possible implementation manner, a channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations, and the determining, by the station according to the resource indication information, a position of a resource allocated to the station includes: determining, by the station according to a sequential position of the station in the resource allocation sequence of the N stations and the bitmap, a position of a resource block unit allocated to the station.

With reference to any one of the first to the fourth possible implementation manners of the fourth aspect, in a fifth possible implementation manner, the method further includes: receiving, by the station, resource block unit information sent by the access point, where the resource block unit information indicates a size of a resource block unit.

With reference to the fifth possible implementation manner of the fourth aspect, in a sixth possible implementation manner, the station receives the resource block unit information that is sent by the access point by using one of a management frame, a data frame, or a control frame.

With reference to the fourth aspect, in a seventh possible implementation manner, the resource allocation information includes a start position of the resource allocated to the station and a sequential position of the station in the resource allocation sequence of the N stations, and the determining, by the station according to the resource indication information, a position of a resource allocated to the station includes: determining, by the station according to the resource indication information, the sequential position of the station in the resource allocation sequence of the N stations, the start position of the resource allocated to the station, and a start position of a resource occupied by a next station of the station; and determining that a resource between the start position of the resource occupied by the next station of the station and the start position of the station is the position of the resource allocated to the station; or the resource indication information includes an end position of the resource allocated to the station and a sequential position of the station in the resource allocation sequence of the N stations, and the determining, by the station according to the resource indication information, a position of a resource allocated to the station includes: determining, by the station according to the resource indication information, the sequential position of the station in the resource allocation sequence of the N stations, the end position of the resource allocated to the station, and an end position of a resource occupied by a preceding station of the station; and determining that a resource between the end position of the resource occupied by the preceding station of the station and the end position of the resource allocated to the station is the position of the resource allocated to the station.

With reference to the fourth aspect, in an eighth possible implementation manner, the resource allocation information includes an end position of resources allocated to the N stations in the wireless local area network, a bandwidth of the resource allocated to each station in the N stations, and a sequential position of each station in the resource allocation sequence of the N stations, and the determining, by the station according to the resource indication information, a position of a resource allocated to the station includes: determining, by the station according to the resource allocation information, a sequential position of the station in the resource allocation sequence of the N stations, a bandwidth of the resource allocated to the station, the end position of the resources allocated to the N stations in the wireless local area network, bandwidths of resources allocated to all stations after the station in the N stations; and determining, by the station, the position of the resource allocated to the station, according to the sequential position of the station in the N stations, the bandwidth of the resource allocated to the station, the end position, and the bandwidths of the resources allocated to all the stations after the station in the N stations; or the resource indication information includes a start position of resources allocated to the N stations in the wireless local area network, a bandwidth of the resource allocated to each station in the N stations, and a sequential position of each station in the resource allocation sequence of the N stations, and the determining, by the station according to the resource indication information, a position of a resource allocated to the station includes: determining, by the station according to the resource allocation information, a sequential position of the station in the resource allocation sequence of the N stations, a bandwidth of the resource allocated to the station, the start position of the resources allocated to the N stations in the wireless local area network, bandwidths of resources allocated to all stations before the station in the N stations; and determining, by the station, the position of the resource allocated to the station, according to the sequential position of the station in the N stations, the bandwidth of the resource allocated to the station, the start position, and the bandwidths of the resources allocated to all the stations before the station in the N stations.

With reference to any one of the fourth aspect, or the first to the eighth possible implementation manners of the fourth aspect, in a ninth possible implementation manner, the receiving, by a station, resource indication information sent by an access point includes: receiving, by the station, a data frame sent by the access point, where the data frame carries the resource indication information.

Based on the foregoing technical solutions, in the embodiments of the present application, an access point determines resource allocation information according to a resource allocation sequence of N stations in a wireless local area network and positions of resources allocated to the N stations, and sends resource indication information that includes the resource allocation sequence of the N stations and the resource allocation information, so that each station in the N stations obtains, according to the resource indication information, a position of a resource allocated to the station. In the embodiments of the present application, redundancy between indication information of different stations is utilized, so that signaling overheads of resource indication information can be reduced.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Technical solutions of the present application may be applied to an orthogonal frequency division multiplexing (OFDM) technology or an OFDMA system, for example, a wireless local area network (WLAN) system. Certainly, the method in the embodiments of the present application may be further applied to an OFDM or OFDMA system of another type. This is not limited in this embodiment of the present application.

To easily understand the embodiments of the present application, some elements used in description of the embodiments of the present application are first described herein.

An access point (AP) is a wireless switch applied to a wireless network, and is a core of the wireless network. The access point is an access point for a mobile computer user to connect to a wired network, and is mainly used in the household wideband, inside the building, and in the campus. Typical coverage is dozens of meters and even hundreds of meters. Currently, the main technology is the 802.11 series. The access point is equivalent to a bridge connecting a wired network and a wireless network, and is mainly used to connect wireless network clients, and connect the wireless network to Ethernet.

A station (STA) is any wireless terminal device, for example, a computer installed with a wireless network adapter, a smartphone having a Wi-Fi module, a tablet computer, or a set top box.

Figure 1:
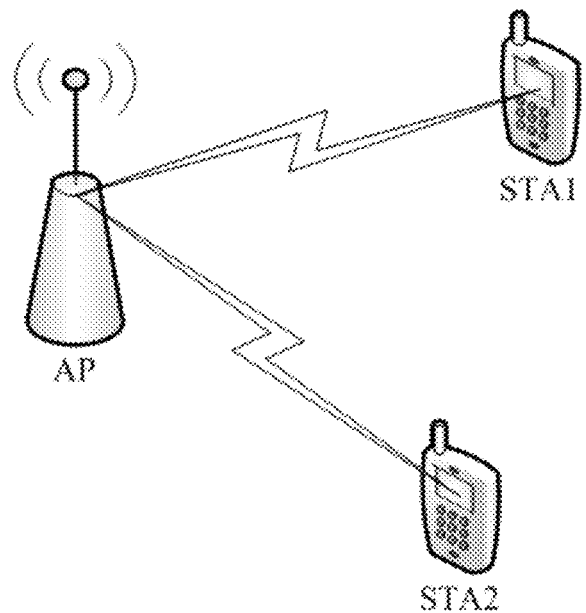
FIG. 1 is a schematic diagram of a WLAN deployment scenario to which embodiments of the present application may be applied.

FIG. 1 is a schematic diagram of a WLAN deployment scenario to which embodiments of the present application may be applied. As shown in FIG. 1, the WLAN deployment scenario includes one access point and at least one station. Exemplarily, in the scenario shown in FIG. 1, an AP separately communicates with a STA1 and a STA2. Optionally, the AP may be a device supporting the 802.11ax standard, and can be back-ward compatible with various WLAN standards such as 802.11ac, 802.11n, 802.11g, 802.11b, and 802.11a.

In the embodiments of the present application, the AP may send resource indication information to one or more stations in a data transmission manner of broadcast.

Figure 2:
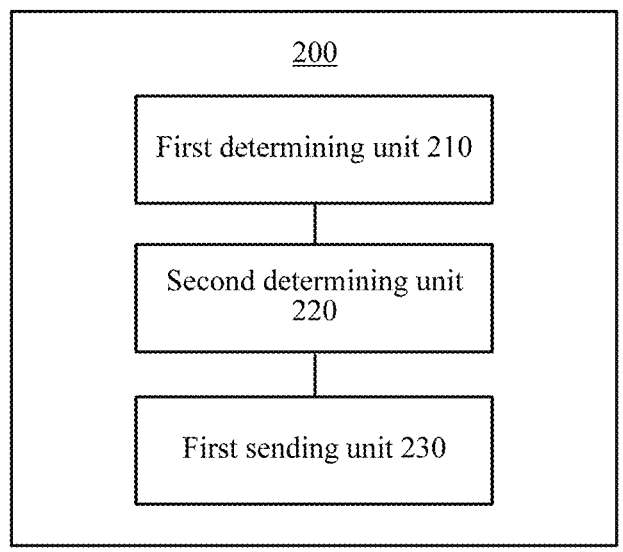
FIG. 2 is a schematic block diagram of an access point according to an embodiment of the present application.

FIG. 2 is a schematic block diagram of an access point according to an embodiment of the present application. As shown in FIG. 2, an access point 200 includes a first determining unit 210, a second determining unit 220, and a first sending unit 230.

The first determining unit 210 is configured to determine a resource allocation sequence of N stations in a wireless local area network and a position of a resource allocated to each station in the N stations.

The second determining unit 220 is configured to determine resource allocation information according to the resource allocation sequence of the N stations and the position of the resource allocated to each station in the N stations, where the resource allocation information is used to reflect a relative position of the resource allocated to each station in the N stations.

The first sending unit 230 is configured to send resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

Therefore, in this embodiment of the present application, an access point determines resource allocation information according to a resource allocation sequence of N stations in a wireless local area network and positions of resources allocated to the N stations, and sends resource indication information that includes the resource allocation sequence of the N stations and the resource allocation information, so that each station in the N stations obtains, according to the resource indication information, a position of a resource allocated to the station. In this embodiment of the present application, redundancy between indication information of different stations is utilized, so that signaling overheads of resource indication information can be reduced.

It should be understood that the resource indication information may further include an identifier of each station in the N stations. The identifier of the station may be an associate station identification (AID) of the station, a MAC (Media Access Control) ID, or an AID of a Partial part. This is not limited in this embodiment of the present application.

It should be further understood that, the station in this embodiment of the present application may refer to one station, or a station group including multiple stations. This is not limited in this embodiment of the present application.

Optionally, in another embodiment, a channel resource of the wireless local area network is divided into multiple resource block units, and the second determining unit 220 is configured to: re-number resource block units in the multiple resource block units other than resource block units allocated to the first i–1 stations in the N stations, where 2≤i<N; and determine resource allocation information of the $i^{th}$ station according to numbers of the resource block units in the multiple resource block units other than the resource block units allocated to the first i–1 stations in the N stations and a position of a resource allocated to the $i^{th}$ station.

It should be understood that the resource block unit may refer to a size of a smallest OFDMA sub-channel or a quantity of sub-carriers used when OFDMA is used in a current basic service set (BSS). For example, the size of the sub-channel may be 1.25 MHz, 2.5 MHz, or 5 MHz, and the quantity of the sub-carriers may be 12 data tones, 24 data tones, or 48 data tones. This is not limited in this embodiment of the present application.

Optionally, in another embodiment, the resource allocation information of the $i^{th}$ station in the N stations includes a sub-bitmap, and each bit in the sub-bitmap represents whether a resource block unit corresponding to each bit is allocated to the $i^{th}$ station.

Optionally, in another embodiment, the resource allocation information of the $i^{th}$ station includes a start number of a resource block unit allocated to the $i^{th}$ station in the resource block units in the multiple resource block units other than the resource block units allocated to the first i–1 stations in the N stations and includes an offset relative to the start number.

Optionally, in another embodiment, the first determining unit is configured to determine the resource allocation sequence of the N stations in descending order of quantities of resource block units allocated to the N stations, where a resource allocated to the $(i-1)^{th}$ station in the N stations is greater than or equal to a resource allocated to the $i^{th}$ station.

Optionally, in another embodiment, the resource allocation information of the $i^{th}$ station includes an offset corresponding to a resource block unit allocated to the $i^{th}$ station in the resource block units in the multiple resource block units other than the resource block units allocated to the first i–1 stations in the N stations.

Optionally, in another embodiment, when resource allocation information of the $m^{th}$ station in the N stations has been already determined, and a quantity of resource block units, for which resource indication information is not determined, in the multiple resource block units is N–m, the resource allocation information of the N stations includes m pieces of resource allocation information corresponding to the first m stations in the N stations, where the resource allocation information of the N stations indicates that one resource block unit is allocated to each station from the $(m+1)^{th}$ station to the $N^{th}$ station in the N stations, and 1≤m<N.

Optionally, in another embodiment, a channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

Alternatively, in another embodiment, a channel resource of the wireless local area network is divided into multiple resource block units, and the second determining unit 220 is configured to: determine, according to a position of a resource allocated to the $i^{th}$ station in the N stations, a bandwidth of the resource allocated to the $i^{th}$ station in the N stations; and determine the resource allocation information according to the bandwidth of the resource allocated to the $i^{th}$ station in the N stations and a sequential position of the $i^{th}$ station in the N stations, where the resource allocation information includes the bandwidth of the resource allocated to the $i^{th}$ station and the sequential position of the $i^{th}$ station in the N stations, and the bandwidth of the resource allocated to the i$^{th}$ station in the N stations is a quantity of resource block units allocated to the i$^{th}$ station in the N stations.

Optionally, in another embodiment, the channel resource of the wireless local area network is divided into the multiple resource block units, the bandwidth of the resource allocated to the i$^{th}$ station in the N stations is the quantity of the resource block units allocated to the i$^{th}$ station in the N stations, and the resource allocation information includes the quantity of the resource block units allocated to the i$^{th}$ station and the sequential position of the i$^{th}$ station in the N stations.

Optionally, in another embodiment, when quantities of resource block units allocated to the N stations are equal, bandwidths of resources allocated to the N stations are represented by using one numerical value, the numerical value represents the quantity of the resource block units allocated to each station in the N stations, and the resource allocation information includes the sequential position of the i$^{th}$ station in the N stations and the numerical value.

Optionally, in another embodiment, the access point further includes a second sending unit.

Figure 3:
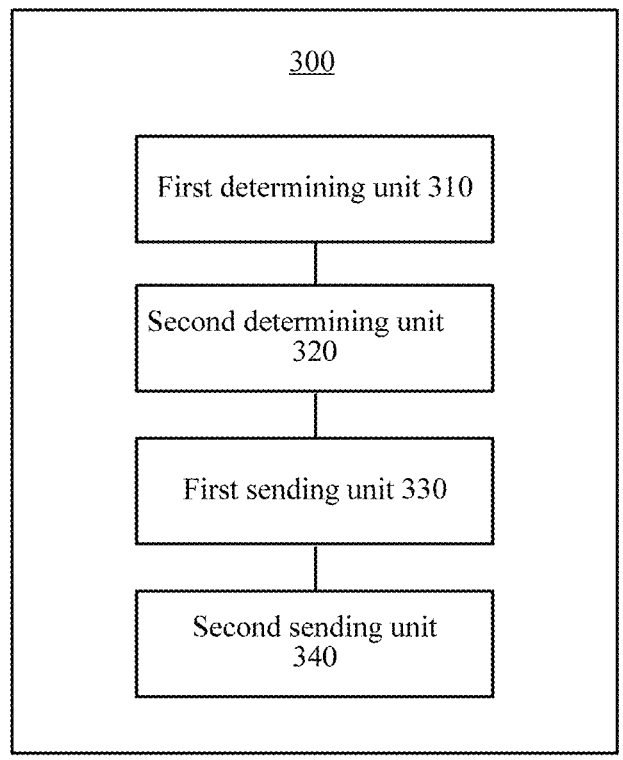
FIG. 3 is a schematic block diagram of an access point according to another embodiment of the present application.

Specifically, as shown in FIG. 3, an access point 300 includes: a first determining unit 310, a second determining unit 320, a first sending unit 330, and a second sending unit 340.

Specifically, the first determining unit 310 corresponds to the first determining unit 210 in FIG. 2, the second determining unit 320 corresponds to the second determining unit 220 in FIG. 2, and the first sending unit 330 corresponds to the first sending unit 230 in FIG. 2. To avoid repetition, details are not described herein again. The second sending unit 340 is configured to send resource block unit information to the i$^{th}$ station, where the resource block unit information indicates a size of a resource block unit.

Optionally, in another embodiment, the second sending unit 340 is configured to send the resource block unit information to the i$^{th}$ station by using one of a management frame, a data frame, or a control frame.

Alternatively, in another embodiment, the second determining unit 320 is configured to: determine, according to the position of the resource allocated to each station in the N stations, an end position of a resource allocated to the i$^{th}$ station in the N stations; and determine the resource allocation information according to the end position of the resource allocated to the i$^{th}$ station in the N stations and a sequential position of the i$^{th}$ station in the resource allocation sequence of the N stations, where the resource allocation information includes the end position of the resource allocated to the i$^{th}$ station and the sequential position of the i$^{th}$ station in the resource allocation sequence of the N stations.

Alternatively, in another embodiment, the second determining unit 320 is configured to: obtain a start position or an end position of resources allocated to the N stations; determine, according to the resource allocation sequence of the N stations and positions of the resources allocated to the N stations, a bandwidth of a resource allocated to the i$^{th}$ station in the N stations; and determine the resource allocation information according to the bandwidth of the resource allocated to the i$^{th}$ station in the N stations, a sequential position of the i$^{th}$ station in the resource allocation sequence of the N stations, and an identifier of the i$^{th}$ station, where the resource allocation information includes the start position or the end position, the bandwidth of the resource allocated to the i$^{th}$ station, and the sequential position of the i$^{th}$ station in the resource allocation sequence of the N stations.

Optionally, in another embodiment, the first sending unit 330 is configured to send a data frame to the i$^{th}$ station in the N stations, where the data frame carries the resource indication information.

It should be noted that, the access points in FIG. 2 and FIG. 3 can implement processes involving an access point in methods in FIG. 6 to FIG. 10. Specifically, functions of the access points in FIG. 2 and FIG. 3 correspond to functions of access points involved in the methods in FIG. 6 to FIG. 10. For details, refer to the processes in the methods shown in FIG. 6 to FIG. 10 in the following specification, and to avoid repetition, details are not described herein again.

Figure 4:
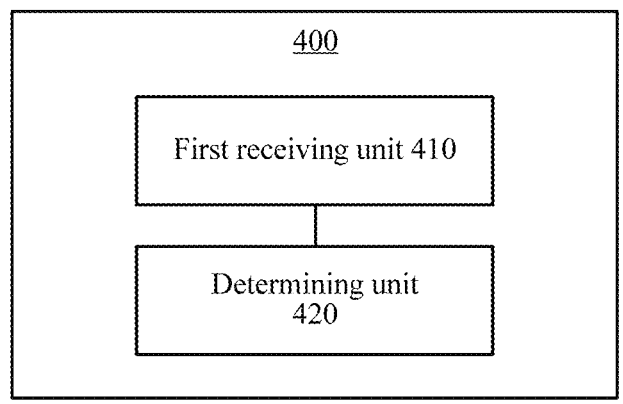
FIG. 4 is a schematic block diagram of a station according to an embodiment of the present application.
Figure 5:
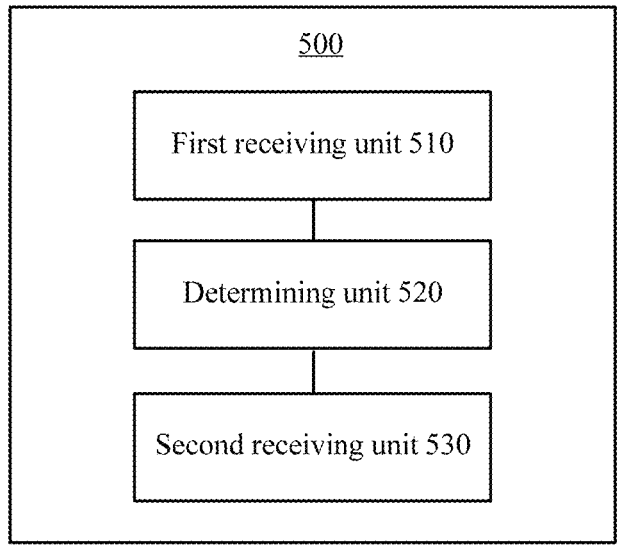
FIG. 5 is a schematic block diagram of a station according to another embodiment of the present application.

The foregoing describes in detail the access point in the embodiments of the present application with reference to FIG. 2 and FIG. 3, and the following describes the station in the embodiments of the present application with reference to FIG. 4 and FIG. 5.

FIG. 4 is a schematic block diagram of a station according to an embodiment of the present application. As shown in FIG. 4, a station 400 includes a first receiving unit 410 and a determining unit 420.

Specifically, the first receiving unit 410 is configured to receive resource indication information sent by an access point, where the resource indication information is used to indicate a resource allocation sequence of N stations and resource allocation information, and the resource allocation information is used to reflect a relative position of a resource allocated to each station in the N stations; and the determining unit 420 is configured to determine, according to the resource indication information, a position of a resource allocated to the station, where N is greater than or equal to 2.

Therefore, in this embodiment of the present application, a station receives resource indication information that is sent by an access point and that is used to indicate a resource allocation sequence of N stations and resource allocation information, where the resource allocation information is used to reflect a relative position of a resource allocated to each station in the N stations; and the station determines, according to the resource indication information, a position of a resource allocated to the station. In this embodiment of the present application, redundancy between indication information of different stations is utilized, so that signaling overheads of the indication information can be reduced.

Alternatively, in another embodiment, a channel resource of a wireless local area network is divided into multiple resource block units, and resource allocation information of the station is used to instruct the station to obtain, according to the resource allocation information of the station, a position of a resource block unit allocated to the station, and the determining unit 420 is configured to determine, according to the resource allocation information of the station, the position of the resource block unit allocated to the station.

Optionally, in another embodiment, the resource allocation information includes a sub-bitmap, each bit in the sub-bitmap represents whether a resource block unit corresponding to each bit is allocated to the station corresponding to the sub-bitmap, and the determining unit 420 is configured to determine, according to the sub-bitmap of the station, the position of the resource block unit allocated to the station.

Alternatively, in another embodiment, a channel resource of a wireless local area network is divided into multiple resource block units, and the resource allocation information includes a quantity of resource block units allocated to the station and a sequential position of the station in the resource allocation sequence of the N stations, and the determining unit 420 is configured to: determine, according to the resource indication information, the sequential position of the station in the resource allocation sequence of the N stations, the quantity of the resource block units allocated to the station, and a quantity of resource block units allocated to a station before the station in the N stations; and determine, according to the quantity of the resource block units allocated to the station before the station in the N stations and the quantity of the resource block units allocated to the station, a position of the resource block unit allocated to the station.

Alternatively, in another embodiment, a channel resource of a wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations, and the determining unit 420 is configured to determine, according to a sequential position of the station in the resource allocation sequence of the N stations and the bitmap, a position of a resource block unit allocated to the station.

Alternatively, in another embodiment, the station further includes a second receiving unit.

Specifically, as shown in FIG. 5, a station 500 includes: a first receiving unit 510, a determining unit 520, and a second receiving unit 530.

Specifically, the first receiving unit 510 and the determining unit 520 respectively correspond to the first receiving unit 410 and the determining unit 420 in FIG. 3. To avoid repetition, details are not described herein again. The second receiving unit 530 is configured to receive resource block unit information sent by the access point, where the resource block unit information indicates a size of a resource block unit.

Optionally, in another embodiment, the second receiving unit 530 receives the resource block unit information that is sent by the access point by using one of a management frame, a data frame, or a control frame.

Alternatively, in another embodiment, the resource allocation information includes a start position of the resource allocated to the station and a sequential position of the station in the resource allocation sequence of the N stations; and the determining unit 420 is configured to determine, according to the resource indication information, the sequential position of the station in the resource allocation sequence of the N stations, the start position of the resource allocated to the station, and a start position of a resource occupied by a next station of the station; and determine that a resource between the start position of the resource occupied by the next station of the station and the start position of the station is the position of the resource allocated to the station.

Alternatively, in another embodiment, the resource indication information includes an end position of the resource allocated to the station and a sequential position of the station in the resource allocation sequence of the N stations; and the determining unit 420 is configured to: determine, according to the resource indication information, the sequential position of the station in the resource allocation sequence of the N stations, the end position of the resource allocated to the station, and an end position of a resource occupied by a preceding station of the station; and determine that a resource between the end position of the resource occupied by the preceding station of the station and the end position of the resource allocated to the station is the position of the resource allocated to the station.

Alternatively, in another embodiment, the resource allocation information includes an end position of resources allocated to the N stations in a wireless local area network, a bandwidth of the resource allocated to each station in the N stations, and a sequential position of each station in the resource allocation sequence of the N stations; and the determining unit 420 is configured to: determine, according to the resource allocation information, a sequential position of the station in the resource allocation sequence of the N stations, a bandwidth of the resource allocated to the station, the end position of the resources allocated to the N stations in the wireless local area network, and bandwidths of resources allocated to all stations after the station in the N stations; and determine the position of the resource allocated to the station, according to the sequential position of the station in the N stations, the bandwidth of the resource allocated to the station, the end position, and the bandwidths of the resources allocated to all the stations after the station in the N stations.

Alternatively, in another embodiment, the resource indication information includes a start position of resources allocated to the N stations in a wireless local area network, a bandwidth of the resource allocated to each station in the N stations, and a sequential position of each station in the resource allocation sequence of the N stations; and the determining unit 420 is configured to: determine, according to the resource allocation information, a sequential position of the station in the resource allocation sequence of the N stations, a bandwidth of the resource allocated to the station, the start position of the resources allocated to the N stations in the wireless local area network, and bandwidths of resources allocated to all stations before the station in the N stations; and determine the position of the resource allocated to the station, according to the sequential position of the station in the N stations, the bandwidth of the resource allocated to the station, the start position, and the bandwidths of the resources allocated to all stations before the station in the N stations.

Optionally, in another embodiment, the first receiving unit is configured to receive a data frame sent by the access point, where the data frame carries the resource indication information.

It should be noted that, the stations in FIG. 4 and FIG. 5 can implement processes involving a station in methods in FIG. 6 to FIG. 10. Specifically, functions of the stations in FIG. 4 and FIG. 5 correspond to functions of stations involved in the methods in FIG. 6 to FIG. 10. For details, refer to the processes in the methods shown in FIG. 6 to FIG. 10 in the following specification, and to avoid repetition, details are not described herein again.

The foregoing describes in detail the access point in the embodiments of the present application with reference to FIG. 2 and FIG. 3, and describes in detail the station in the embodiments of the present application with reference to FIG. 4 and FIG. 5, and the following describes the resource allocation method in the embodiments of the present application with reference to FIG. 6 to FIG. 10.

Figure 6:
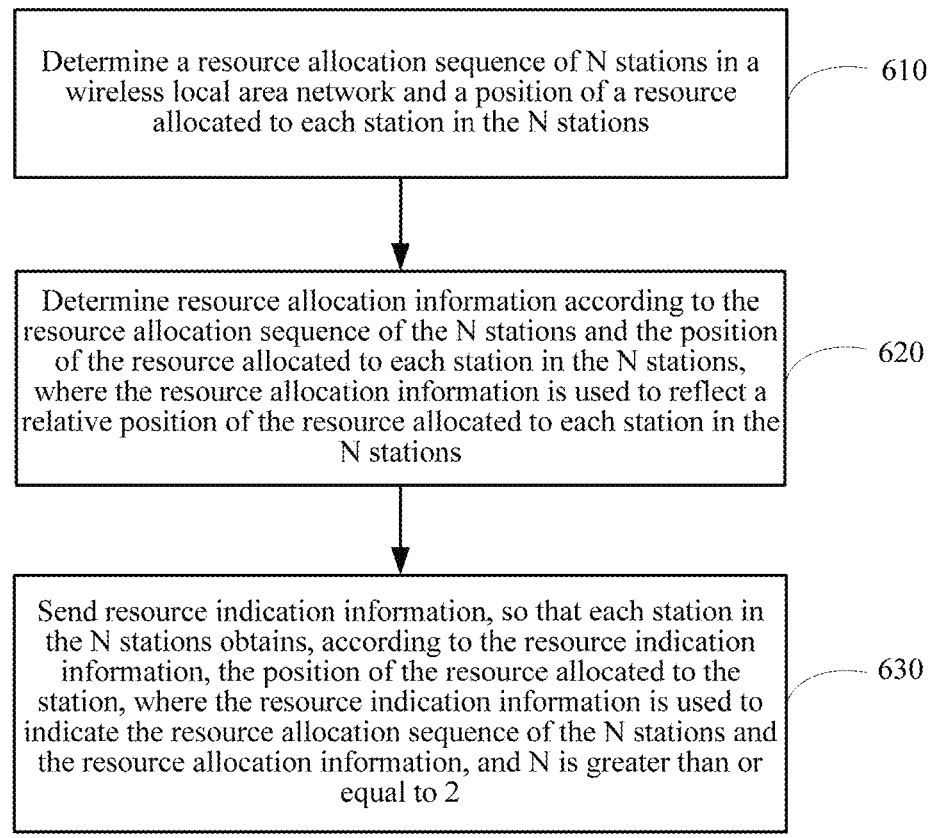
FIG. 6 is a schematic flowchart of a resource allocation method according to an embodiment of the present application.

FIG. 6 is a schematic flowchart of a resource allocation method according to an embodiment of the present application. The method in FIG. 6 is executed by an access point. As shown in FIG. 6, the method includes:

610: Determine a resource allocation sequence of N stations in a wireless local area network and a position of a resource allocated to each station in the N stations.

Specifically, the resource allocation sequence may be a sequence in which the access point allocates resources to the N stations. Positions of resources allocated to the N stations may be a specific position of a resource allocated to each station in the N station, for example, may be specifically resource block units, or a frequency band of a resource allocated to the station.

620: Determine resource allocation information according to the resource allocation sequence of the N stations and the position of the resource allocated to each station in the N stations, where the resource allocation information is used to reflect a relative position of the resource allocated to each station in the N stations.

For example, the resource allocation information may include a quantity of resource block units of the resource allocated to each station, a start frequency, an end frequency, or a bandwidth value of the allocated resource, or the like. The resource allocation information can reflect the position of the resource allocated to each station in the N stations.

630: Send resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

Specifically, the access point may send the resource indication information to the N stations in a broadcast manner, or may send the resource indication information to at least one station in the N stations, where the other stations in the N stations may receive the resource indication information.

Therefore, in this embodiment of the present application, an access point determines resource allocation information according to a resource allocation sequence of N stations in a wireless local area network and positions of resources allocated to the N stations, and sends resource indication information that includes the resource allocation sequence of the N stations and the resource allocation information, so that each station in the N stations obtains, according to the resource indication information, a position of a resource allocated to the station. In this embodiment of the present application, redundancy between indication information of different stations is utilized, so that signaling overheads of resource indication information can be reduced.

It should be understood that the resource indication information may further include an identifier of each station in the N stations. The identifier of the station may be an associate station identification (AID) of the station, a MAC (Media Access Control) ID, or an AID of a Partial part. This is not limited in this embodiment of the present application.

It should be further understood that, the station in this embodiment of the present application may refer to one station, or a station group including multiple stations. This is not limited in this embodiment of the present application.

Optionally, in another embodiment, a channel resource of the wireless local area network is divided into multiple resource block units, in 620, resource allocation information of the $i^{th}$ station may be determined according to a position of a resource allocated to the $(i-1)^{th}$ station in the N stations, where the resource allocation information of the $i^{th}$ station is used to instruct the $i^{th}$ station in the N stations in the wireless local area network to obtain, according to the resource allocation information of the $i^{th}$ station, a position of a resource block unit allocated to the $i^{th}$ station; and the resource allocation information is determined according to the resource allocation information of the N stations, where the resource allocation information includes the resource allocation information of the N stations.

Specifically, the resource allocation information includes the resource allocation information corresponding to the N stations, where the resource allocation information of the $i^{th}$ station is used to instruct the $i^{th}$ station in the N stations in the wireless local area network to obtain, according to the resource allocation information of the $i^{th}$ station, the position of the resource block unit allocated to the $i^{th}$ station. In an embodiment, the resource indication information includes resource allocation information of (N−1) stations. For example, resource allocation information of the first (N−1) stations in the N stations can indicate resource occupation statuses of the first (N−1) stations, and a resource occupied by the last station is the remaining resource in the total resources other than the resources occupied by the first (N−1) stations. In other words, the last station (the $N^{th}$ station) may obtain, according to the resource allocation information of the first (N−1) stations, a position of the resource occupied by the station.

Optionally, in another embodiment, in 620, resource block units in the multiple resource block units other than resource block units allocated to the first i−1 stations in the N stations may be re-numbered, where 2≤i<N; and resource allocation information of the $i^{th}$ station is determined according to numbers of the resource block units in the multiple resource block units other than the resource block units allocated to the first i−1 stations in the N stations and a position of a resource allocated to the $i^{th}$ station.

In other words, after a resource is allocated to the $(i-1)^{th}$ station, the remaining resources that are not allocated are re-numbered, and the resource allocation information of the $i^{th}$ station is determined according to the re-numbered resources.

Optionally, in another embodiment, the resource allocation information of the $i^{th}$ station includes a start number of a resource block unit allocated to the $i^{th}$ station in the resource block units in the multiple resource block units other than the resource block units allocated to the first i−1 stations in the N stations and includes an offset relative to the start number.

For example, the access point needs to allocate 32 resource block units to four stations, and sizes of resource block units occupied by the four stations are 16, 8, 4, and 4 respectively. A station occupying 16 resource block units is the first station, a station occupying eight resource block units is the second station, a station occupying four resource block units is the third station, and a station occupying four resource block units is the fourth station.

First, stations are sorted in descending order of sizes of resources needing to be allocated to the stations, and resources are preferentially allocated to a station needing more resources. Meanwhile, after a resource is allocated to the $i^{th}$ station, the remaining resource block units are re-numbered, for example, are numbered starting from 0, and resource allocation information of the $(i+1)^{th}$ station is constructed. Specifically, resource allocation information of the stations is as follows:

resource allocation information of the first station: 00000 01111;

resource allocation information of the second station: 0000 0111;

resource allocation information of the third station: 000 011; and resource allocation information of the fourth station: 00 11.

In the existing resource allocation method, each station is instructed separately. According to the existing resource allocation method, resource allocation information of the stations is as follows:

resource allocation information of the first station: 00000 01111;

resource allocation information of the second station: 10000 00111;

resource allocation information of the third station: 11000 00011; and resource allocation information of the fourth station: 11100 00011.

As can be seen, in the existing resource allocation method, for each station, two 5-bit sequences are needed to indicate a start position of allocated resource block units and an offset relative to the start position. In this embodiment of the present application, first, the stations are sorted in descending order of sizes of resources needing to be allocated to the stations, and resources are preferentially allocated to a station needing more resources. Meanwhile, after a resource is allocated to the $i^{th}$ station, the remaining resource block units are re-numbered, and resource allocation information of the $(i+1)^{th}$ station is constructed. In this way, in this embodiment of the present application, a size of indication information can be reduced. Compared with the existing method, in this embodiment of the present application, the size of the indication information can be reduced by 12 bits. Therefore, in this embodiment of the present application, redundancy between indication information of different stations is utilized, so that signaling overheads of indication information can be reduced.

Optionally, in another embodiment, a channel resource of the wireless local area network is divided into multiple resource block units, the resource allocation information of the $i^{th}$ station in the N stations includes a sub-bitmap, and each bit in the sub-bitmap represents whether a resource block unit corresponding to each bit is allocated to the $i^{th}$ station.

For example, when a value of a bit in the sub-bitmap corresponding to the $i^{th}$ station is 1, it indicates that a resource block unit corresponding to the bit is allocated to the $i^{th}$ station, and when a value of a bit is 0, it indicates that a resource block unit corresponding to the bit is not allocated to the $i^{th}$ station.

For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. Specifically, resource allocation information of the stations is as follows:

a sub-bitmap of the first station: 11111111111111110000000000000000;

a sub-bitmap of the second station: 1111111100000000;

a sub-bitmap of the third station: 11110000; and a sub-bitmap of the fourth station: 1111.

In the existing resource allocation method, each station is instructed separately. According to the existing resource allocation method, sub-bitmaps of the stations are as follows:

a sub-bitmap of the first station: 11111111111111110000000000000000;

a sub-bitmap of the second station: 00000000000000001111111100000000;

a sub-bitmap of the third station: 00000000000000000000000011110000; and a sub-bitmap of the fourth station: 00000000000000000000000000001111.

As can be seen, compared with the existing method, in this embodiment of the present application, a size of the resource indication information can be reduced. Therefore, in this embodiment of the present application, redundancy between indication information of different stations is utilized, so that signaling overheads of indication information can be reduced.

Optionally, in another embodiment, in 610, the resource allocation sequence of the N stations may be determined in descending order of quantities of resource block units allocated to the N stations, where a resource allocated to the $(i-1)^{th}$ station in the N stations is greater than or equal to a resource allocated to the $i^{th}$ station. That is, in 610, the resource allocation sequence of the N stations may be determined in descending order of sizes of the resources allocated to the N stations, where the resource allocated to the $(i-1)^{th}$ station in the N stations is greater than or equal to the resource allocated to the $i^{th}$ station.

It should be understood that, a bandwidth of a resource may be a quantity of resource block units. Specifically, in 610, bandwidths of the resources allocated to the N stations may be determined; the resource allocation sequence of the N stations may be determined according to the bandwidths of the resources allocated to the N stations; and positions of the resources allocated to the N stations may be determined according to the bandwidths of the resources allocated to the N stations and the resource allocation sequence of the N stations, where the resource allocated to the $(i-1)^{th}$ station in the N stations is greater than or equal to the resource allocated to the $i^{th}$ station.

In other words, the resource allocation sequence of the N stations may be determined according to the bandwidths of the resources occupied by the stations. Specifically, the resource allocation sequence may be determined in descending order of sizes of the resources allocated to the stations.

Alternatively, in another embodiment, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

For example, a value of each bit in the bitmap may be 1 or 0. In the bitmap, consecutive bits having a same value represent that resource block units corresponding to the consecutive bits having a same value are allocated to one of the N stations. For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. The following bitmap may be used for resource indication:

1111 1111 1111 1111 0000 0000 1111 0000.

The bitmap is in a form of positive offset. Values of the first 16 bits in the bitmap are 1, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{nd}$ resource block units are allocated to the fourth station.

Alternatively, the following bitmap may be used for resource indication:

0000 0000 0000 0000 1111 1111 0000 1111.

The bitmap is in a form of negative offset. Values of the first 16 bits in the bitmap are 0, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{nd}$ resource block units are allocated to the fourth station.

Optionally, in another embodiment, in 620, a bandwidth of a resource allocated to the $i^{th}$ station in the N stations may be determined according to a position of the resource allocated to the $i^{th}$ station in the N stations; and the resource allocation information is determined according to the bandwidth of the resource allocated to the $i^{th}$ station in the N stations and a sequential position of the $i^{th}$ station in the N stations, where the resource allocation information includes the bandwidth of the resource allocated to the $i^{th}$ station and the sequential position of the $i^{th}$ station in the N stations.

Further, a channel resource of the wireless local area network is divided into multiple resource block units, in 620, the bandwidth of the resource allocated to the $i^{th}$ station in the N stations is a quantity of resource block units allocated to the $i^{th}$ station in the N stations, and the resource allocation information includes the quantity of the resource block units allocated to the $i^{th}$ station and the sequential position of the $i^{th}$ station in the N stations.

Specifically, when resources allocated to each station are continuous, the quantity of the resource block units may be an offset of the resource block units allocated to the $i^{th}$ station.

That is, in 620, the resource allocation information of the $i^{th}$ station includes an offset corresponding to the resource block unit allocated to the $i^{th}$ station in the resource block units in the multiple resource block units other than the resource block units allocated to the first i−1 stations in the N stations.

The offset may be a quantity of resources allocated to the station, or may be a difference between a start number and a largest number of resource block units allocated to the $i^{th}$ station.

For example, the access point needs to allocate 32 resource block units to four stations, and sizes of resource block units occupied by the four stations are 16, 8, 4, and 4 respectively. A station occupying 16 resource block units is the first station, a station occupying eight resource block units is the second station, a station occupying four resource block units is the third station, and a station occupying four resource block units is the fourth station.

First, the stations are sorted in descending order of sizes of resources needing to be allocated to the stations, and resources are preferentially allocated to a station needing more resources. Meanwhile, after a resource is allocated to the $i^{th}$ station, the remaining resource block units are re-numbered, for example, are numbered starting from 0, and resource allocation information of the $(i+1)^{th}$ station is constructed. Specifically, resource allocation information of the stations is as follows:

resource allocation information of the first station: 01111;
resource allocation information of the second station: 0111;
resource allocation information of the third station: 011; and
resource allocation information of the fourth station: 11.

In the existing resource allocation method, each station is instructed separately. According to the existing resource allocation method, resource allocation information of the stations is as follows:

resource allocation information of the first station: 00000 01111;
resource allocation information of the second station: 10000 00111;
resource allocation information of the third station: 11000 00011; and
resource allocation information of the fourth station: 11100 00011.

As can be seen, in the existing resource allocation method, for each station, two 5-bit fields are needed to indicate a start position and an offset position of allocated resource block units. In this embodiment of the present application, first, the stations are sorted in descending order of sizes of resources needing to be allocated to the stations, and resources are preferentially allocated to a station needing more resources. Meanwhile, after a resource is allocated to the $i^{th}$ station, the remaining resource block units are re-numbered, and resource allocation information of the $(i+1)^{th}$ station is constructed. In this way, in this embodiment of the present application, a size of indication information can be reduced. Compared with the existing method, in this embodiment of the present application, the size of the indication information can be reduced by 26 bits. Therefore, in this embodiment of the present application, redundancy between indication information of different stations is utilized, so that signaling overheads of indication information can be reduced.

It should be understood that, the resource block unit may refer to a size of a smallest OFDMA sub-channel or a quantity of sub-carriers used when OFDMA is used in a current basic service set (BSS). For example, the size of the sub-channel may be 1.25 MHz, 2.5 MHz, or 5 MHz, and the quantity of the sub-carriers may be 12 data tones, 24 data tones, or 48 data tones. This is not limited in this embodiment of the present application.

It should be further understood that, the bandwidth of the resource allocated to the $i^{th}$ station may be a bandwidth, or may be a quantity of resource block units.

Specifically, the access point does not sort the stations according to the bandwidths of the resources allocated to the stations. A sequence of the stations corresponds to a sequence of the resources. Specifically, an allocation sequence of the stations corresponds to an ascending order (from a low frequency to a high frequency) of sizes of the resources. The station may determine, according to an identifier of the station in the resource indication information, a relative position of the station and a quantity of resource block units of a resource occupied by the station. The station may determine, according to the resource indication information, a quantity of resource block units of a resource occupied by a station before or after the station, and the station further determines a position of the resource allocated to the station.

In other words, in 620, the bandwidth of the resource allocated to the $i^{th}$ station in the N stations may be determined according to the position of the resource allocated to the $i^{th}$ station in the N stations; and the resource allocation information is determined according to the bandwidth of the resource allocated to the $i^{th}$ station in the N stations and the sequential position of the $i^{th}$ station in the N stations, where the resource allocation information includes the bandwidth of the resource allocated to the $i^{th}$ station and the sequential position of the $i^{th}$ station in the N stations.

In other words, for the $n^{th}$ station, the station needs to know, according to the resource indication information, a quantity of resource block units allocated by the access point to all stations before the station, or a quantity of resource block units allocated by the access point to all stations after the station. Based on a quantity of smallest resource blocks, and with reference to a quantity of resource blocks transmitted by the $n^{th}$ station, the $n^{th}$ station may uniquely determine accurate information of a sub-channel that is to work.

For example, a start position (frequency channel number) or an end position (frequency channel number) of the resources allocated to the N stations are $f_0$ and $f_1$. In other words, a total size of the resources allocated to the N stations is $BW=f_0-f_1$, and the resource block unit may be represented by using bw. For the $n^{th}$ station, a quantity of resource block units allocated by the access point to the station is $m_n$. Therefore, the $n^{th}$ station may determine that a position of a resource allocated by the access point to the station is:

$$[f_0+(m_1*bw)+(m_2*bw)+ \ldots +(m_{n-1}*bw), f_0+ \\ (m_1*bw)+(m_2*bw)+ \ldots +(m_n*bw)], \text{ or}$$

$$[f_1-(m_n*bw)- \ldots -(m_N*bw), f_1-(m_{n+1}*bw)- \ldots \\ -(m_N*bw)].$$

Optionally, in another embodiment, when resource allocation information of the $m^{th}$ station in the N stations has been already determined, and a quantity of resource block units, for which resource indication information is not determined, in the multiple resource block units is N−m, the resource allocation information of the N stations includes m pieces of resource allocation information corresponding to the first m stations in the N stations, where the resource allocation information of the N stations indicates that one resource block unit is allocated to each station from the $(m+1)^{th}$ station to the $N^{th}$ station in the N stations, and 1≤m<N.

Specifically, when a quantity of resource block units remaining after a resource is allocated to the $m^{th}$ station is N−m, the resource indication information includes m pieces of resource allocation information corresponding to the first m stations in the N stations.

In other words, after a resource is allocated to the $m^{th}$ station, when a quantity of stations to which no resource is allocated is equal to a quantity of resource block units that are not allocated, resource allocation information of the $m^{th}$ station to the $N^{th}$ station does not need to be determined, and one resource block unit is allocated to each station of the remaining stations to which no resource is allocated.

For example, if the access point needs to allocate 32 resource block units to five stations, and 28 resource blocks are allocated to the first station, the resource indication information includes only resource allocation information of the first station. For example, the third station may determine, according to the resource allocation information of the first station in the resource indication information and a sequential position of the third station in the five stations, that a position of a resource block unit allocated to the third station is the $30^{th}$ resource block unit, and similarly, the other stations may determine positions of resources allocated to the stations.

Alternatively, in another embodiment, when quantities of resource block units allocated to the N stations are equal, the resource allocation information includes the sequential position of the $i^{th}$ station in the N stations and a numerical value of the quantity.

For example, resources allocated to all the stations have a same quantity of resource block units, and the $n^{th}$ station in the N stations may determine that a position of a resource allocated by the access point to the station may be:

$$[f_0+(n-1)*m*bw, f_0+n*m*bw], \text{ or}$$

$$[f_1-n*m*bw, f_1-(n-1)*m*bw].$$

Optionally, in another embodiment, the method further includes: sending resource block unit information to the $i^{th}$ station, where the resource block unit information indicates a size of a resource block unit.

Figure 7:
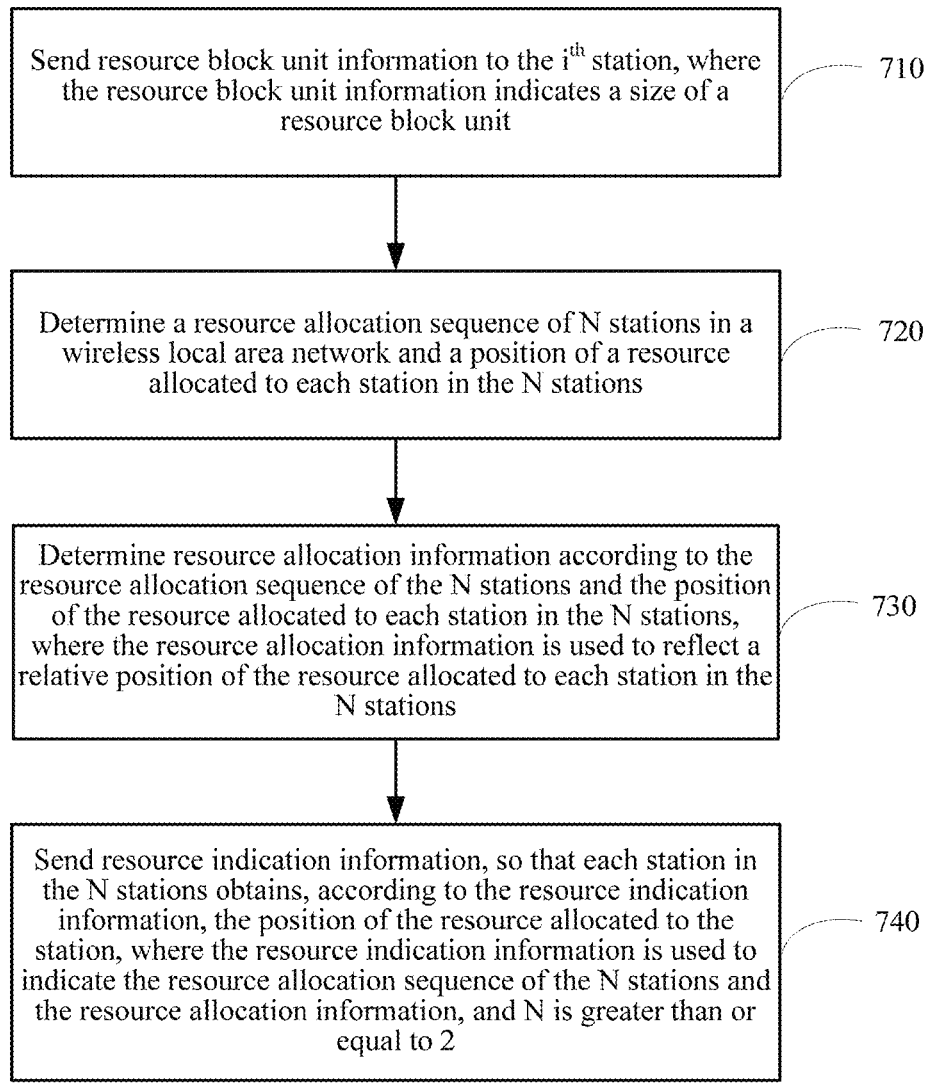
FIG. 7 is a schematic flowchart of a resource allocation method according to another embodiment of the present application.

Specifically, FIG. 7 is a schematic flowchart of a resource allocation method according to another embodiment of the present application. The method in FIG. 7 is executed by an access point. As shown in FIG. 7, the method includes:

710: Send resource block unit information to the $i^{th}$ station, where the resource block unit information indicates a size of a resource block unit.

720: Determine a resource allocation sequence of N stations in a wireless local area network and a position of a resource allocated to each station in the N stations.

730: Determine resource allocation information according to the resource allocation sequence of the N stations and the position of the resource allocated to each station in the N stations, where the resource allocation information is used to reflect a relative position of the resource allocated to each station in the N stations.

740: Send resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

720, 730, and 740 respectively correspond to 610, 620, and 630 in FIG. 6, and to avoid repetition, details are not described again.

Specifically, in another embodiment, in 710, the access point sends the resource block unit information to the $i^{th}$ station by using one of a management frame, a data frame, or a control frame.

For example, the management frame may be a beacon frame Beacon, or may be a management frame of another type. The access point may add a related field to a frame of another type (for example, a data frame or a control frame). The access point may notify, in a broadcast or multicast manner, of sizes of resource block units allocated to all the stations or multiple stations in a local basic service set (BSS).

The resource block unit may refer to a size of a smallest OFDMA sub-channel or a quantity of sub-carriers used when OFDMA is used in a current basic service set. For example, the size of the sub-channel may be 1.25 MHz, 2.5 MHz, or 5 MHz, and the quantity of the sub-carriers may be 12 data tones, 24 data tones, or 48 data tones. This is not limited in this embodiment of the present application.

It should be noted that the access point may not send the resource block unit information to the $i^{th}$ station. For example, the access point and the station already negotiate with each other about the resource block unit. In other words, the access point and the station already determine a size of the resource block unit in advance. In this case, the access point does not need to notify the station of the size of the resource block unit by using dedicated signaling. In this case, the size of the resource block unit may be determined according to the standard specifications.

Alternatively, in another embodiment, in 720, a start position of a resource allocated to the $i^{th}$ station in the N stations may be determined according to the resource allocation sequence of the N stations and positions of resources allocated to the N stations; and the resource allocation information is determined according to the start position of the resource allocated to the $i^{th}$ station in the N stations and a sequential position of the $i^{th}$ station in the resource allocation sequence of the N stations, where the resource allocation information includes the start position of the resource allocated to the $i^{th}$ station and the sequential position of the $i^{th}$ station in the resource allocation sequence of the N stations.

Specifically, after receiving the resource indication information sent by the access point, the station may determine, according to the resource allocation information, a relative position of the station in the N stations, a start position of the resource allocated to the station, and a start position of a resource occupied by a next station of the station, and determine that a resource between the start position of the resource occupied by the next station and the start position of the resource allocated to the station is the position of the resource block unit allocated to the station.

For example, a start position (frequency channel number) of a resource of the $n^{th}$ station is $f_n$, a start position (frequency channel number) of a resource occupied by a next station (the $(n+1)^{th}$ station) of the station is $f_{n+1}$, and a position of the resource occupied by the $n^{th}$ station is $[f_n, f_{n+1}]$.

Alternatively, in another embodiment, in 620, an end position of a resource allocated to the $i^{th}$ station in the N stations may be determined according to the resource allocation sequence of the N stations and positions of resources allocated to the N stations; and the resource allocation information is determined according to the end position of the resource allocated to the $i^{th}$ station in the N stations and a sequential position of the $i^{th}$ station in the resource allocation sequence of the N stations, where the resource allocation information includes the end position of the resource allocated to the $i^{th}$ station and the sequential position of the $i^{th}$ station in the resource allocation sequence of the N stations.

Specifically, after receiving the resource indication information sent by the access point, the station may determine, according to the resource allocation information, a relative position of the station in the N stations, an end position of the resource allocated to the station, and an end position of a resource occupied by a preceding station of the station; and determine that a resource between the end position of the resource allocated to the station and the end position of the resource occupied by the preceding station of the station is the position of the resource block unit allocated to the station.

For example, an end position (frequency channel number) of a resource of the $n^{th}$ station is $f_n$, an end position (frequency channel number) of a resource occupied by a preceding station (the $(n-1)^{th}$ station) of the station is $f_{n-1}$, and a position of the resource occupied by the $n^{th}$ station is $[f_{n-1}, f_n]$.

Alternatively, in another embodiment, in 620, a start position or an end position of resources allocated to the N stations may be obtained; a bandwidth of a resource allocated to the $i^{th}$ station in the N stations is determined according to the resource allocation sequence of the N stations and positions of the resources allocated to the N stations; and the resource allocation information is determined according to the bandwidth of the resource allocated to the $i^{th}$ station in the N stations and a sequential position of the $i^{th}$ station in the resource allocation sequence of the N stations, where the resource allocation information includes the start position or the end position, the bandwidth of the resource allocated to the $i^{th}$ station, and the sequential position of the $i^{th}$ station in the resource allocation sequence of the N stations.

Specifically, after receiving the resource indication information sent by the access point, the station may determine, according to an identifier of the station, a relative position of the station in the N stations, the bandwidth of the resource allocated to the station, the end position of the resources allocated to the N stations in the wireless local area network, a bandwidth of a resource allocated to a station whose relative position number is greater than a relative position number of the station in the N stations. The station determines the position of the resource block unit allocated to the station, according to the relative position of the station in the N stations, the bandwidth of the resource allocated to the station, the end position, and the bandwidth of the resource allocated to the station whose relative position number is greater than the relative position number of the station in the N stations.

For example, the end position (frequency channel number) of the resources allocated to the N stations in the wireless local area network is $f_{END}$, a bandwidth of a resource allocated to the $n^{th}$ station is $\Delta n$, and the $n^{th}$ station may determine that a position of the resource allocated to the station is:

$$[f_{END}-\Delta_N-\Delta_{N-1}-\Delta_{N-2}-\ldots-\Delta_n, f_{END}-\Delta_N-\Delta_{N-1}-\Delta_{N-2}-\ldots-\Delta_{n+1}].$$

Alternatively, after receiving the resource indication information sent by the access point, the station may determine, according to an identifier of the station, a relative position of the station in the N stations, the bandwidth of the resource allocated to the station, the start position of the resources allocated to the N stations in the wireless local area network, a bandwidth of a resource allocated to a station whose relative position number is less than a relative position number of the station in the N stations. The station determines the position of the resource block unit allocated to the station, according to the relative position of the station in the N stations, the bandwidth of the resource allocated to the station, the start position, and the bandwidth of the resource allocated to the station whose relative position number is less than the relative position number of the station in the N stations.

For example, the start position (frequency channel number) of the resources allocated to the N stations in the wireless local area network is $f_{START}$, a bandwidth of a resource allocated to the $n^{th}$ station is $\Delta n$, and the $n^{th}$ station may determine that a position of the resource allocated to the station is:

$$[f_{START}+\Delta_1+\Delta_2+\ldots+\Delta_{n-1}, f_{START}+\Delta_1+\Delta_2+\ldots+\Delta_n].$$

Optionally, in another embodiment, in 630, a data frame may be sent to the $i^{th}$ station in the N stations, where the data frame carries the resource indication information.

Specifically, the resource indication information may be located at a preamble field, a middle part, or an end of the data frame.

Figure 8:
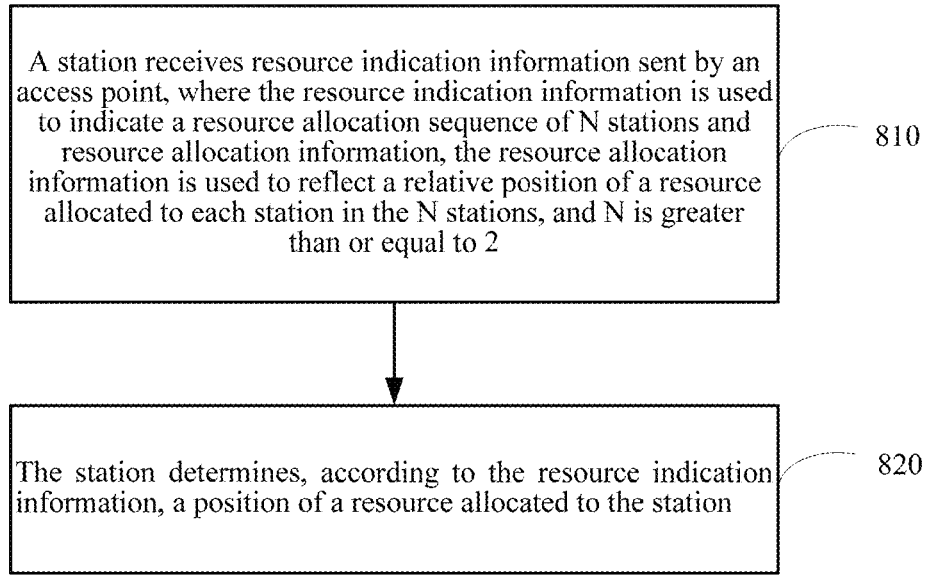
FIG. 8 is a schematic flowchart of a resource allocation method according to another embodiment of the present application.
Figure 9:
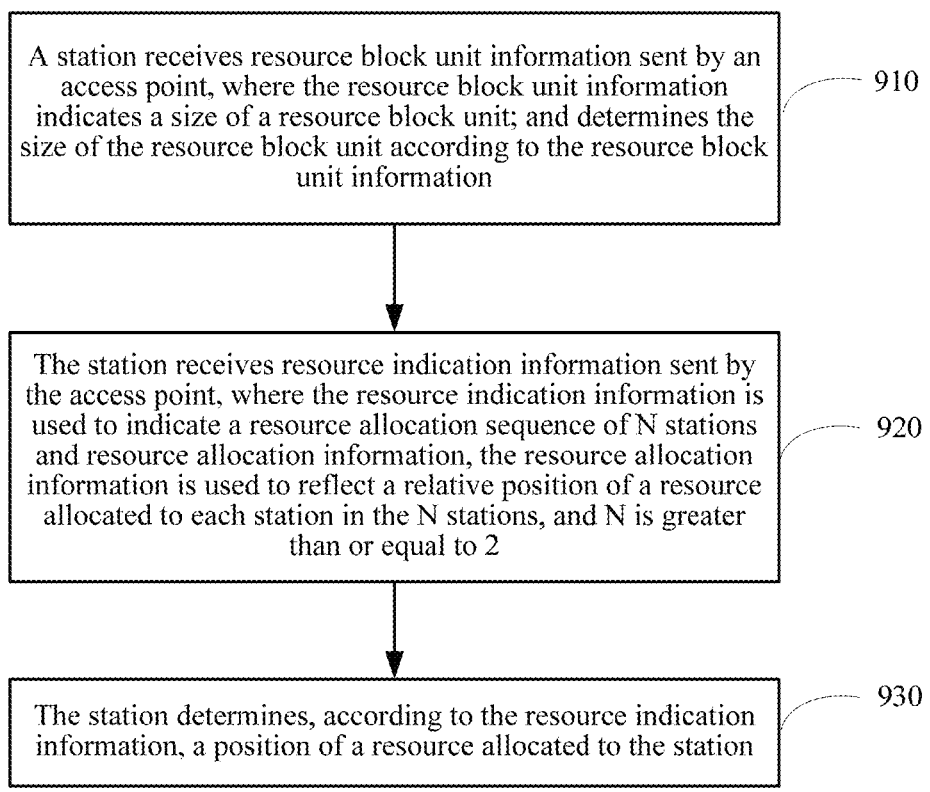
FIG. 9 is a schematic flowchart of a resource allocation method according to another embodiment of the present application.

The foregoing describes the resource allocation method in the embodiments of the present application from the perspective of an access point with reference to FIG. 6 and FIG. 7, and the following describes the resource allocation method in the embodiments of the present application from the perspective of a station with reference to FIG. 8 and FIG. 9.

Specifically, FIG. 8 is a schematic flowchart of a resource allocation method according to an embodiment of the present application. The method in FIG. 8 is executed by a station. It should be understood that, interaction between and related properties and functions of the access point and the station in the resource allocation method described from the perspective of the station correspond to descriptions from the perspective of the access point. For brevity, repeated descriptions are avoided properly. As shown in FIG. 8, the method includes:

810: The station receives resource indication information sent by an access point, where the resource indication information is used to indicate a resource allocation sequence of N stations and resource allocation information, the resource allocation information is used to reflect a relative position of a resource allocated to each station in the N stations, and N is greater than or equal to 2.

Specifically, the station may receive the resource indication information that is sent by the access point in a data transmission manner of broadcast, or may listen to resource indication information that is sent by the access point to another station.

820: The station determines, according to the resource indication information, a position of a resource allocated to the station.

Therefore, in this embodiment of the present application, a station receives resource indication information that is sent by an access point and that is used to indicate a resource allocation sequence of N stations and resource allocation information, where the resource allocation information is used to reflect a relative position of a resource allocated to each station in the N stations; and the station determines, according to the resource indication information, a position of a resource allocated to the station. In this embodiment of the present application, redundancy between indication information of different stations is utilized, so that signaling overheads of the indication information can be reduced.

It should be understood that the resource allocation sequence may be a sequence in which the access point allocates resources to the N stations. Positions of the resources allocated to the N stations may be a specific position of a resource allocated to each station in the N station, for example, may be specifically resource block units, or a frequency band of a resource allocated to the station. The resource allocation information may be a quantity of resource block units of the resource allocated to each station, a start frequency, an end frequency, or a bandwidth value of the allocated resource, or the like. The resource allocation information can reflect the position of the resource allocated to each station in the N stations.

It should be understood that the resource indication information may further include an identifier of each station in the N stations. The identifier of the station may be an associate station identification (AID) of the station, a MAC (Media Access Control) ID, or an AID of a Partial part. This is not limited in this embodiment of the present application.

It should be further understood that, the station in this embodiment of the present application may refer to one station, or a station group including multiple stations. This is not limited in this embodiment of the present application.

Optionally, in another embodiment, a channel resource of a wireless local area network is divided into multiple resource block units, and resource allocation information of the station is used to instruct the station to obtain, according to the resource allocation information of the station, a position of a resource block unit allocated to the station, and in 820, the station may determine, according to the resource allocation information of the station, the position of the resource block unit allocated to the station.

For example, the resource allocation information of the station may include a start number of the resource block unit of the resource allocated to the station and include an offset relative to the start number.

For example, the access point needs to allocate 32 resource block units to four stations, and sizes of resource block units occupied by the four stations are 16, 8, 4, and 4 respectively. A station occupying 16 resource block units is the first station, a station occupying eight resource block units is the second station, a station occupying four resource block units is the third station, and a station occupying four resource block units is the fourth station.

First, the stations are sorted in descending order of sizes of resources needing to be allocated to the stations, and resources are preferentially allocated to a station needing more resources. Meanwhile, after a resource is allocated to the $i^{th}$ station, the remaining resource block units are re-numbered, for example, are numbered starting from 0, and resource allocation information of the $(i+1)^{th}$ station is constructed. Specifically, resource allocation information of the stations is as follows:

resource allocation information of the first station: 00000 01111;

resource allocation information of the second station: 0000 0111;

resource allocation information of the third station: 000 011; and resource allocation information of the fourth station: 00 11.

For example, the third station may determine, according to the resource allocation information of the third station, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Further, in another embodiment, the resource allocation information includes a sub-bitmap, each bit in the sub-bitmap represents whether a resource block unit corresponding to each bit is allocated to the station corresponding to the sub-bitmap, and in 820, the station may determine, according to the sub-bitmap of the station, a position of the resource block unit allocated to the station.

For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. Specifically, resource allocation information of the stations is as follows:

a sub-bitmap of the first station: 11111111111111110000000000000000;
    a sub-bitmap of the second station: 1111111100000000;
    a sub-bitmap of the third station: 11110000; and
    a sub-bitmap of the fourth station: 1111.

For example, the third station may determine, according to the resource allocation information (sub-bitmap) of the third station, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Alternatively, in another embodiment, a channel resource of a wireless local area network is divided into multiple resource block units, and the resource allocation information includes a quantity of resource block units allocated to the station and a sequential position of the station in the resource allocation sequence of the N stations, and in 820, the station may determine, according to identifier information of the station, the sequential position of the station in the resource allocation sequence of the N stations, the quantity of the resource block units allocated to the station, and a quantity of resource block units allocated to a station before the station in the N stations; and determine, according to the quantity of the resource block units allocated to the station before the station in the N stations and the quantity of the resource block units allocated to the station, a position of the resource block unit allocated to the station.

For example, the station knows in advance a start position (frequency channel number) and an end position (frequency channel number) of the resources allocated to the N stations, for example, the start position and the end position respectively are $f_0$ and $f_1$. In other words, a total size of the resources allocated to the N stations is $BW=f_0-f_1$, and the resource block unit may be represented by using bw. For the $n^{th}$ station, a quantity of resource block units allocated by the access point to the station is $m_n$. Therefore, the $n^{th}$ station may determine that a position of a resource allocated by the access point to the station is:

$$[f_0+(m_1*bw)+(m_2*bw)+ \ldots +(m_{n-1}*bw),f_0+(m_1*bw)+(m_2*bw)+ \ldots +(m_n*bw)], \text{ or}$$

$$[f_1-(m_n*bw)- \ldots -(m_N*bw),f_1-(m_{n+1}*bw)- \ldots -(m_N*bw)].$$

Further, when quantities of resource block units allocated to the N stations are equal, for example, resources occupied by all stations have a same quantity of resource block units, the $n^{th}$ station in the N stations may determine that a position of a resource allocated by the access point to the station is:

$$[f_0+(n-1)*m*bw,f_0+n*m*bw], \text{ or}$$

$$[f_1-n*m*bw,f_1-(n-1)*m*bw].$$

Alternatively, in another embodiment, a channel resource of a wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations, and in 820, the station may determine, according to a sequential position of the station in the resource allocation sequence of the N stations and the bitmap, a position of the resource block unit allocated to the station.

For example, a value of each bit in the bitmap may be 1 or 0. In the bitmap, consecutive bits having a same value represent that resource block units corresponding to the consecutive bits having a same value are allocated to one of the N stations. For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. The following bitmap may be used for resource indication:

1111 1111 1111 1111 0000 0000 1111 0000.

The bitmap is in a form of positive offset. Values of the first 16 bits in the bitmap are 1, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{th}$ resource block units are allocated to the fourth station.

Alternatively, the following bitmap may be used for resource indication:

0000 0000 0000 0000 1111 1111 0000 1111.

The bitmap is in a form of negative offset. Values of the first 16 bits in the bitmap are 0, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{th}$ resource block units are allocated to the fourth station.

For example, the third station may determine, according to the bitmap, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Optionally, in another embodiment, the method further includes: receiving, by the station, resource block unit information sent by the access point, where the resource block unit information indicates a size of a resource block unit; and determining the size of the resource block unit according to the resource block unit information.

Specifically, FIG. 9 is a schematic flowchart of a resource allocation method according to another embodiment of the present application. Specifically, the method in FIG. 9 is executed by a station. As shown in FIG. 9, the method includes:

910: The station receives resource block unit information sent by an access point, where the resource block unit information indicates a size of a resource block unit; and determines the size of the resource block unit according to the resource block unit information.

920: The station receives resource indication information sent by the access point, where the resource indication information is used to indicate a resource allocation sequence of N stations and resource allocation information, the resource allocation information is used to reflect a relative position of a resource allocated to each station in the N stations, and N is greater than or equal to 2.

Specifically, the station may receive the resource indication information that is sent by the access point in a broadcast manner, or may listen to resource indication information that is sent by the access point to another station.

930: The station determines, according to the resource indication information, a position of a resource allocated to the station.

920 and 930 respectively correspond to 810 and 820 in FIG. 8, and to avoid repetition, details are not described again.

Further, in another embodiment, in 910, the station receives the resource block unit information that is sent by the access point by using one of a management frame, a data frame, or a control frame.

Specifically, the management frame may be a beacon frame Beacon, or may be a management frame of another type. The access point may add a related field to a frame of another type (for example, a data frame or a control frame). The access point may notify, in a broadcast or multicast manner, resource block units allocated to all stations or multiple stations in the local BSS.

The resource block unit may refer to a size of a smallest OFDMA sub-channel or a quantity of sub-carriers used when OFDMA is used in a current basic service set (BSS). For example, the size of the sub-channel may be 1.25 MHz, 2.5 MHz, or 5 MHz, and the quantity of the sub-carriers may be 12 data tones, 24 data tones, or 48 data tones. This is not limited in this embodiment of the present application.

It should be noted that the access point may not send the resource block unit information to the $i^{th}$ station. For example, the access point and the station already negotiate with each other about the resource block unit. In other words, the access point and the station already determine a size of the resource block unit in advance. In this case, the access point does not need to notify the station of the size of the resource block unit by using dedicated signaling. In this case, the size of the resource block unit may be determined according to the standard specifications.

Alternatively, in another embodiment, the resource allocation information includes a start position of the resource allocated to the station and a sequential position of the station in the resource allocation sequence of the N stations; and in 920, the station may determine, according to the resource indication information, the sequential position of the station in the resource allocation sequence of the N stations, the start position of the resource allocated to the station, and a start position of a resource occupied by a next station of the station; and determine that a resource between the start position of the resource occupied by the next station of the station and the start position of the station is the position of the resource allocated to the station.

Specifically, after receiving the resource indication information sent by the access point, the station may determine, according to an identifier of the station, a relative position of the station in the N stations, the start position of the resource allocated to the station, and the start position of the resource occupied by the next station of the station, and determine that a resource between the start position of the resource occupied by the next station and the start position of the resource allocated to the station is the position of the resource block unit allocated to the station.

For example, a start position (frequency channel number) of a resource of the $n^{th}$ station is $f_n$, a start position (frequency channel number) of a resource occupied by a next station (the $(n+1)^{th}$ station) of the station is $f_{n+1}$, and the $n^{th}$ station may determine, according to the received resource indication information, a position of the resource allocated to the $n^{th}$ station. Specifically, the $n^{th}$ station may determine that the position of the resource allocated to the station is $[f_n, f_{n+1}]$.

Alternatively, in another embodiment, the resource indication information includes an end position of the resource allocated to the station and a sequential position of the station in the resource allocation sequence of the N stations; and in 920, the station may determine, according to the resource indication information, the sequential position of the station in the resource allocation sequence of the N stations, the end position of the resource allocated to the station, and an end position of a resource occupied by a preceding station of the station; and determine that a resource between the end position of the resource occupied by the preceding station of the station and the end position of the resource allocated to the station is the position of the resource allocated to the station.

Specifically, after receiving the resource indication information sent by the access point, the station may determine, according to the identifier of the station, a relative position of the station in the N stations, the end position of the resource allocated to the station, and the end position of the resource occupied by the preceding station of the station, and determine that the resource between the end position of the resource allocated to the station and the end position of the resource occupied by the preceding station of the station is the position of the resource block unit allocated to the station.

For example, an end position (frequency channel number) of a resource of the $n^{th}$ station is $f_n$, an end position (frequency channel number) of a resource occupied by a preceding station (the $(n-1)^{th}$ station) of the station is $f_{n-1}$, and the $n^{th}$ station may determine, according to the received resource indication information, a position of the resource allocated to the $n^{th}$ station. Specifically, the $n^{th}$ station may determine that the position of the resource allocated to the station is $[f_{n-1}, f_n]$.

Alternatively, in another embodiment, the resource allocation information includes an end position of the resources allocated to the N stations in the wireless local area network, a bandwidth of a resource allocated to each station in the N stations, and a sequential position of each station in the resource allocation sequence of the N stations; and in 820, the station may determine, according to the resource allocation information, a sequential position of the station in the resource allocation sequence of the N stations, the bandwidth of the resource allocated to the station, the end position of the resources allocated to the N stations in the wireless local area network, and bandwidths of resources allocated to all stations after the station in the N stations; and determine the position of the resource allocated to the station, according to the sequential position of the station in the N stations, the bandwidth of the resource allocated to the station, the end position, and the bandwidths of the resources allocated to all the stations after the station in the N stations.

Specifically, after receiving the resource indication information sent by the access point, the station may determine, according to an identifier of the station, a relative position of the station in the N stations, the bandwidth of the resource allocated to the station, the end position of the resources allocated to the N stations in the wireless local area network, a bandwidth of a resource allocated to a station whose relative position number is greater than a relative position number of the station in the N stations. The station determines the position of the resource block unit allocated to the station, according to the relative position of the station in the N stations, the bandwidth of the resource allocated to the station, the end position, and the bandwidth of the resource allocated to the station whose relative position number is greater than the relative position number of the station in the N stations.

For example, the end position (frequency channel number) of the resources allocated to the N stations in the wireless local area network is $f_{END}$, a bandwidth of a resource allocated to the $n^{th}$ station is $\Delta n$, and the $n^{th}$ station may determine, according to the received resource indication information, a position of the resource allocated to the $n^{th}$ station. Specifically, the $n^{th}$ station may determine that the position of the resource allocated to the station is:

$$[f_{END}-\Delta_N-\Delta_{N-1}-\Delta_{N-2}-\ldots-\Delta_n, f_{END}-\Delta_N-\Delta_{N-1}-\Delta_{N-2}-\ldots-\Delta_{n+1}].$$

Alternatively, in another embodiment, the resource indication information includes a start position of the resources allocated to the N stations in the wireless local area network, a bandwidth of the resource allocated to each station in the N stations, and a sequential position of each station in the resource allocation sequence of the N stations; and in 920, the station may determine, according to the resource allocation information, a sequential position of the station in the resource allocation sequence of the N stations, the bandwidth of the resource allocated to the station, the start position of the resources allocated to the N stations in the wireless local area network, and bandwidths of resources allocated to all stations before the station in the N stations; and determine the position of the resource allocated to the station, according to the sequential position of the station in the N stations, the bandwidth of the resource allocated to the station, the start position, and the bandwidths of the resources allocated to all the stations before the station in the N stations.

For example, the start position (frequency channel number) of the resources allocated to the N stations in the wireless local area network is $f_{START}$, a bandwidth of a resource allocated to the $n^{th}$ station is $\Delta n$, and the $n^{th}$ station may determine, according to the received resource indication information, a position of the resource allocated to the $n^{th}$ station. Specifically, the $n^{th}$ station may determine that the position of the resource allocated to the station is:

$$[f_{START}+\Delta_1+\Delta_2+\ldots+\Delta_{n-1}, f_{START}+\Delta_1+\Delta_2+\ldots+\Delta_n].$$

Optionally, in another embodiment, in 910, the station may receive a data frame sent by the access point, where the data frame carries the resource indication information.

Specifically, the resource indication information may be located at a preamble field, a middle part, or an end of the data frame.

The foregoing describes the resource allocation method in the embodiments of the present application from the perspective of an access point with reference to FIG. 6 and FIG. 7, and describes the resource allocation method in the embodiments of the present application from the perspective of a station with reference to FIG. 8 and FIG. 9.

Figure 10:
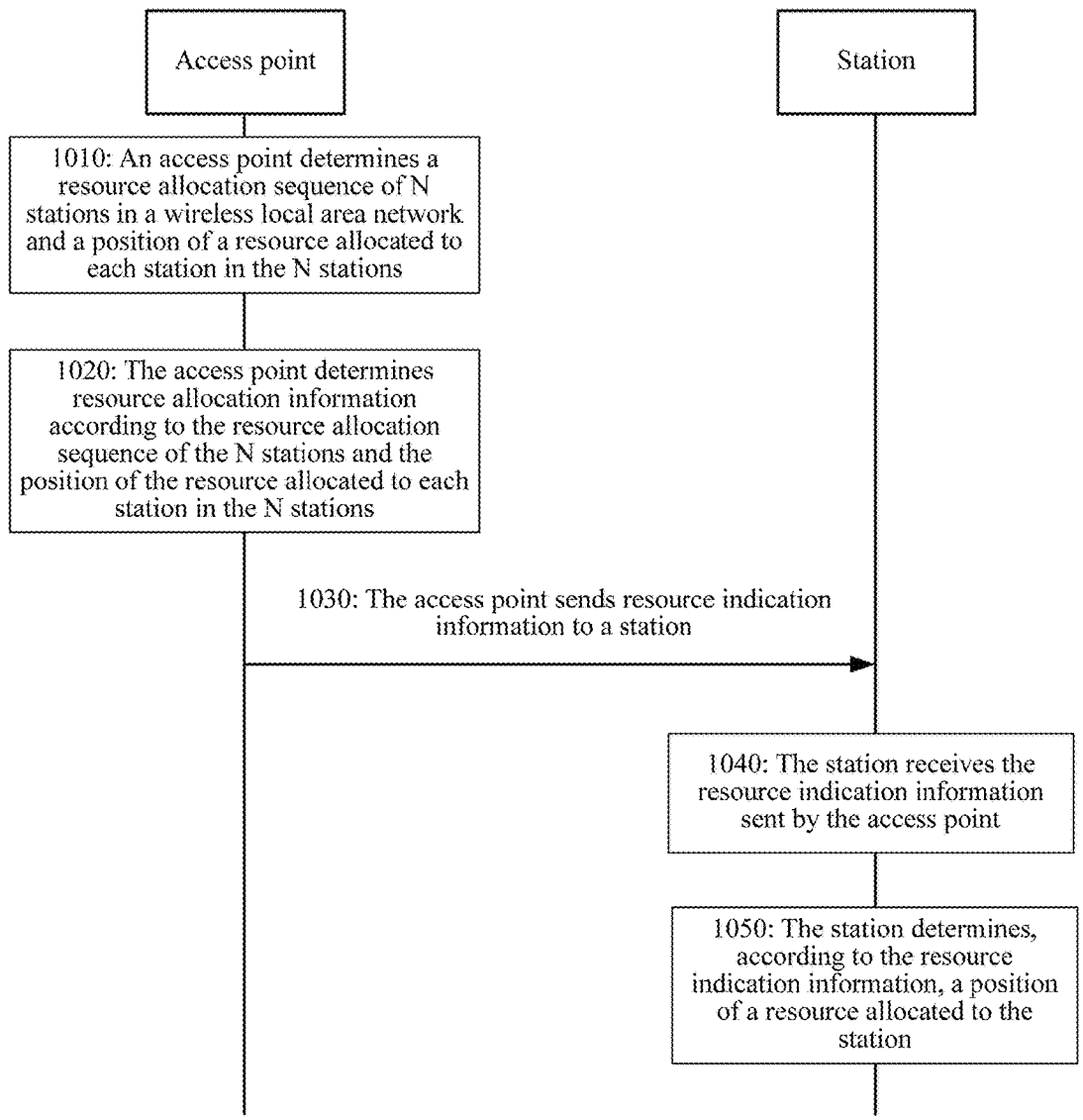
FIG. 10 is a schematic flowchart of a resource allocation method according to another embodiment of the present application.

The following describes in detail the embodiments of the present application with reference to FIG. 10 by using specific examples.

FIG. 10 is a schematic flowchart of a resource allocation method according to another embodiment of the present application. As shown in FIG. 10, the method includes:

1010: An access point determines a resource allocation sequence of N stations in a wireless local area network and a position of a resource allocated to each station in the N stations.

Specifically, the resource allocation sequence may be a sequence in which the access point allocates resources to the N stations. Positions of resources allocated to the N stations may be a specific position of the resource allocated to each station in the N station, for example, may be specifically resource block units, or a frequency band of a resource allocated to the station.

1020: The access point determines resource allocation information according to the resource allocation sequence of the N stations and the position of the resource allocated to each station in the N stations, where the resource allocation information is used to reflect a relative position of the resource allocated to each station in the N stations.

For example, the resource allocation information may include a quantity of resource block units of the resource allocated to each station, a start frequency, an end frequency, or a bandwidth value of the allocated resource, or the like. The resource allocation information can reflect the position of the resource allocated to each station in the N stations.

1030: The access point sends resource indication information to a station, so that each station in the N stations obtains, according to the resource indication information, the position of the resource allocated to each station, where the resource indication information is used to indicate the resource allocation sequence of the N stations and the resource allocation information.

Specifically, the access point may send the resource indication information to the N stations in a broadcast manner, or may send the resource indication information to at least one station in the N stations, where the other stations in the N stations may receive the resource indication information.

1040: The station receives the resource indication information sent by the access point, where the resource indication information is used to indicate the resource allocation sequence of the N stations and the resource allocation information, and the resource allocation information is used to reflect the relative position of the resource allocated to each station in the N stations.

Specifically, the station may receive the resource indication information that is sent by the access point in a data transmission manner of broadcast, or may listen to resource indication information that is sent by the access point to another station.

1050: The station determines, according to the resource indication information, a position of a resource allocated to the station.

Therefore, in this embodiment of the present application, an access point determines resource allocation information according to a resource allocation sequence of N stations in a wireless local area network and positions of resources allocated to the N stations, and sends resource indication information that includes the resource allocation sequence of the N stations and the resource allocation information, so that each station in the N stations obtains, according to the resource indication information, a position of a resource allocated to the station. In this embodiment of the present application, redundancy between indication information of different stations is utilized, so that signaling overheads of resource indication information can be reduced.

The following describes the embodiment in FIG. 10 by using examples.

Example 1

A channel resource of the wireless local area network is divided into multiple resource block units, and the resource allocation information includes resource allocation information corresponding to the N stations, where resource allocation information of the $i^{th}$ station is used to instruct the $i^{th}$ station in the N stations in the wireless local area network to obtain, according to the resource allocation information of the $i^{th}$ station, a position of a resource block unit allocated to the $i^{th}$ station.

For example, the access point needs to allocate 32 resource block units to four stations, and sizes of resource block units occupied by the four stations are 16, 8, 4, and 4 respectively. A station occupying 16 resource block units is the first station, a station occupying eight resource block units is the second station, a station occupying four resource block units is the third station, and a station occupying four resource block units is the fourth station.

First, the access point sorts the stations in descending order of sizes of resources needing to be allocated to the stations, and preferentially allocates resources to a station needing more resources. Meanwhile, after a resource is allocated to the $i^{th}$ station, the remaining resource block units are re-numbered, for example, are numbered starting from 0, and resource allocation information of the $(i+1)^{th}$ station is constructed. Specifically, resource allocation information of the stations is as follows:

resource allocation information of the first station: 00000 01111;

resource allocation information of the second station: 0000 0111;

resource allocation information of the third station: 000 011; and resource allocation information of the fourth station: 00 11.

For example, the third station may determine, according to the resource allocation information of the third station, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Example 2

A channel resource of the wireless local area network is divided into multiple resource block units, and the resource allocation information includes resource allocation information corresponding to the N stations, where resource allocation information of the $i^{th}$ station is used to instruct the $i^{th}$ station in the N stations in the wireless local area network to obtain, according to the resource allocation information of the $i^{th}$ station, a position of a resource block unit allocated to the $i^{th}$ station.

For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. Specifically, resource allocation information of the stations is as follows:

a sub-bitmap of the first station: 11111111111111110000000000000000;

a sub-bitmap of the second station: 1111111100000000;

a sub-bitmap of the third station: 11110000; and a sub-bitmap of the fourth station: 1111.

For example, the third station may determine, according to the resource allocation information (sub-bitmap) of the third station, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Example 3

A channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

For example, the access point needs to allocate 32 resource block units to four stations, and sizes of resource block units occupied by the four stations are 16, 8, 4, and 4 respectively. The first station occupies 16 resource block units, the second station occupies eight resource block units, the third station occupies four resource block units, and the fourth station occupies four resource block units. The following bitmap may be used for resource indication:

1111 1111 1111 1111 0000 0000 1111 0000.

The bitmap is in a form of positive offset. Values of the first 16 bits in the bitmap are 1, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{th}$ resource block units are allocated to the fourth station.

Alternatively, the following bitmap may be used for resource indication:

0000 0000 0000 0000 1111 1111 0000 1111.

The bitmap is in a form of negative offset. Values of the first 16 bits in the bitmap are 0, indicating that the first 16 resource blocks in the 32 resource block units are allocated to the first station, and similarly, the $17^{th}$ to the $24^{th}$ resource block units are allocated to the second station, the $25^{th}$ to the $28^{th}$ resource block units are allocated to the third station, and the $29^{th}$ to the $32^{th}$ resource block units are allocated to the fourth station.

The third station may determine, according to the bitmap, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Example 4

A channel resource of the wireless local area network is divided into multiple resource block units, and the resource allocation information includes resource allocation information corresponding to the N stations, where resource allocation information of the $i^{th}$ station is used to instruct the $i^{th}$ station in the N stations in the wireless local area network to obtain, according to the resource allocation information of the $i^{th}$ station, a position of a resource block unit allocated to the $i^{th}$ station. For example, when resources allocated to each station are continuous, a quantity of the resource block units may be an offset of the resource block units allocated to the $i^{th}$ station, where the offset is an offset from the start number to the largest number of the resource block units allocated to the $i^{th}$ station.

For example, the access point needs to allocate 32 resource block units to four stations, and sizes of resource block units occupied by the four stations are 16, 8, 4, and 4 respectively. A station occupying 16 resource block units is the first station, a station occupying eight resource block units is the second station, a station occupying four resource block units is the third station, and a station occupying four resource block units is the fourth station.

First, the access point sorts the stations in descending order of sizes of resources needing to be allocated to the stations, and preferentially allocates resources to a station needing more resources. Meanwhile, after a resource is allocated to the $i^{th}$ station, the remaining resource block units are re-numbered, for example, are numbered starting from 0, and resource allocation information of the $(i+1)^{th}$ station is constructed. Specifically, resource allocation information of the stations is as follows:

resource allocation information of the first station: 01111;
resource allocation information of the second station: 0111;
resource allocation information of the third station: 011; and
resource allocation information of the fourth station: 11.

The third station may determine, according to the bitmap, that four resource block units are allocated to the station. Then, the third station can determine, according to the resource allocation information of the first station and the resource allocation information of the second station in the resource indication information, that a position of the resource block units allocated to the third station is the $24^{th}$ to the $27^{th}$ resource block units. Similarly, the other stations may determine positions of resources allocated to the stations.

Example 5

A channel resource of the wireless local area network is divided into multiple resource block units, and the resource allocation information includes resource allocation information corresponding to the N stations, where resource allocation information of the $i^{th}$ station is used to instruct the $i^{th}$ station in the N stations in the wireless local area network to obtain, according to the resource allocation information of the $i^{th}$ station, a position of a resource block unit allocated to the $i^{th}$ station.

For example, the access point does not sort the stations according to bandwidths of the resources allocated to the stations. A sequence of the stations corresponds to a sequence of the resources. Specifically, an allocation sequence of the stations corresponds to an ascending order (from a low frequency to a high frequency) of sizes of the resources. The station may determine, according to an identifier of the station in the resource indication information, a relative position of the station and a quantity of resource block units of a resource occupied by the station. The station may determine, according to the resource indication information, a quantity of resource block units of a resource occupied by a station before or after the station, and the station further determines the position of the resource allocated to the station.

For example, a start position (frequency channel number) and an end position (frequency channel number) of resources allocated to the N stations are $f_0$ and $f_1$. In other words, a total size of the resources allocated to the N stations is $BW=f_1-f_0$, and the resource block unit may be represented by using bw. For the $n^{th}$ station, a quantity of resource block units allocated by the access point to the station is $m_n$. Therefore, the $n^{th}$ station may determine that a position of a resource allocated by the access point to the station is:

$$[f_0+(m_1*bw)+(m_2*bw)+\ldots+(m_{n-1}*bw), f_0+(m_1*bw)+(m_2*bw)+\ldots+(m_n*bw)], \text{ or}$$

$$[f_1-(m_n*bw)-\ldots-(m_N*bw), f_1-(m_{n+1}*bw)-\ldots-(m_N*bw)].$$

When quantities of resource block units allocated to the N stations are equal, the quantity of the resource block units allocated to the $i^{th}$ station is the equal quantity.

For example, sub-channels occupied by all the stations have a same size/a same quantity of resource block units, and the $n^{th}$ station in the N stations may determine that a position of a resource allocated by the access point to the station is:

$$[f_0+(n-1)*m*bw, f_0+n*m*bw], \text{ or}$$

$$[f_1-n*m*bw, f_1-(n-1)*m*bw].$$

Example 6

The resource allocation information includes a start position of a resource allocated to the $i^{th}$ station and a sequential position of the $i^{th}$ station in the resource allocation sequence of the N stations.

For example, a start position (frequency channel number) of a resource of the $n^{th}$ station is $f_n$, a start frequency channel number of a resource occupied by a next station (the $(n+1)^{th}$ station) of the station is $f_{n+1}$, and the $n^{th}$ station may determine, according to the received resource indication information, a position of the resource allocated to the $n^{th}$ station. Specifically, the $n^{th}$ station may determine that the position of the resource allocated to the station is $[f_n, f_{n+1}]$.

Example 7

The resource allocation information includes an end position of a resource allocated to the $i^{th}$ station and a sequential position of the $i^{th}$ station in the resource allocation sequence of the N stations.

For example, an end position (frequency channel number) of the resource of the $n^{th}$ station is $f_n$, an end position (frequency channel number) of a resource occupied by a preceding station (the $(n-1)^{th}$ station) of the station is $f_{n-1}$, and the $n^{th}$ station may determine, according to the received resource indication information, a position of the resource allocated to the $n^{th}$ station. Specifically, the $n^{th}$ station may determine that the position of the resource allocated to the station is $[f_{n-1}, f_n]$.

Example 8

The resource allocation information includes an end position of resources allocated to the N stations in the wireless local area network, a bandwidth of a resource allocated to the $i^{th}$ station, and a sequential position of the $i^{th}$ station in the resource allocation sequence of the N stations.

For example, the end position (frequency channel number) of the resources allocated to the N stations in the wireless local area network is $f_{END}$, a bandwidth of a resource allocated to the $n^{th}$ station is $\Delta n$, and the $n^{th}$ station may determine, according to the received resource indication information, a position of the resource allocated to the $n^{th}$ station. Specifically, the $n^{th}$ station may determine that the position of the resource allocated to the station is:

$$[f_{END}-\Delta_N-\Delta_{N-1}-\Delta_{N-2}-\ldots-\Delta_n, f_{END}-\Delta_N-\Delta_{N-1}-\Delta_{N-2}-\ldots-\Delta_{n+1}].$$

Example 9

The resource allocation information includes a start position of a resource allocated to the $i^{th}$ station and a sequential position of the $i^{th}$ station in the resource allocation sequence of the N stations.

For example, a start position (frequency channel number) of the resources allocated to the N stations in the wireless local area network is $f_{START}$, a bandwidth of a resource allocated to the $n^{th}$ station is $\Delta n$, and the $n^{th}$ station may determine, according to the received resource indication information, a position of the resource allocated to the $n^{th}$ station. Specifically, the $n^{th}$ station may determine that the position of the resource allocated to the station is:

$$[f_{START}+\Delta_1+\Delta_2+\ldots+\Delta_{n-1}, f_{START}+\Delta_1+\Delta_2+\ldots+\Delta_n].$$

Figure 11:
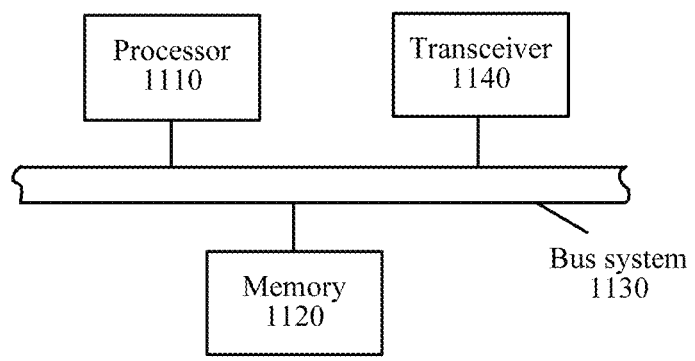
FIG. 11 is a schematic block diagram of an access point according to another embodiment of the present application.

FIG. 11 is a schematic block diagram of an access point according to another embodiment of the present application. An access point 1100 in FIG. 11 includes a processor 1110, a memory 1120, a bus system 1130, and a transceiver 1140. The processor 1110, the memory 1120, and the transceiver 1140 are connected by using the bus system 1130.

Specifically, the processor 1110 invokes, by using the bus system 1130, code stored in the memory 1120, to determine a resource allocation sequence of N stations in a wireless local area network and a position of a resource allocated to each station in the N stations; and determine resource allocation information according to the resource allocation sequence of the N stations and the position of the resource allocated to each station in the N stations, where the resource allocation information is used to reflect a relative position of the resource allocated to each station in the N stations. The transceiver 1140 is configured to send resource indication information, so that each station in the N stations obtains, according to the resource indication information, the position of the resource allocated to each station, where the resource indication information is used to indicate the resource allocation sequence of the N stations and the resource allocation information, and N is greater than or equal to 2.

Therefore, in this embodiment of the present application, an access point determines resource allocation information according to a resource allocation sequence of N stations in a wireless local area network and positions of resources allocated to the N stations, and sends resource indication information that includes the resource allocation sequence of the N stations and the resource allocation information, so that each station in the N stations obtains, according to the resource indication information, a position of a resource allocated to the station. In this embodiment of the present application, redundancy between indication information of different stations is utilized, so that signaling overheads of resource indication information can be reduced.

The method disclosed in the foregoing embodiment of the present application may be applied to the processor 1110, or may be implemented by the processor 1110. The processor 1110 may be an integrated circuit chip and has a signal processing capability. In an implementation process, steps of the foregoing methods may be accomplished by using an integrated logic circuit of hardware in the processor 1110 or an instruction in a form of software. The processor 1110 may be a general purpose processor, a digital signal processor (DSP), an application specific integrated circuit (ASIC), a field programmable gate array (FPGA), or other programmable logic devices, discrete gate or transistor logic devices, and discrete hardware components. The processor 1110 may implement or execute methods, steps and logical block diagrams disclosed in the embodiments of the present application. The general purpose processor may be a microprocessor or the processor may be any conventional processor or the like. Steps of the methods disclosed with reference to the embodiments of the present application may be directly executed and completed by a hardware decoding processor, or may be executed and completed by using a combination of hardware and software modules in the decoding processor. The software module may be located in a mature storage medium in the field, such as a random access memory (RAM), a flash memory, a read-only memory (ROM), a programmable read-only memory, an electrically-erasable programmable memory, or a register. The storage medium is located in the memory 1120, and the processor 1110 reads information in the memory 1120, to implement the steps in the method with reference to the hardware. In addition to a data bus, the bus system 1130 may further include a power bus, a control bus, and a status signal bus. However, for purpose of clear description, various types of buses in the figure are all marked as the bus system 1130.

The access point in FIG. 11 can implement processes involving an access point in the resource allocation method in the embodiments in FIG. 6 to FIG. 10. To avoid repetition, details are not described herein again.

Optionally, in another embodiment, a channel resource of the wireless local area network is divided into multiple resource block units, and the processor 1110 is configured to: re-number resource block units in the multiple resource block units other than resource block units allocated to the first i−1 stations in the N stations, where $2 \leq i < N$; and determine resource allocation information of the $i^{th}$ station according to numbers of the resource block units in the multiple resource block units other than the resource block units allocated to the first i−1 stations in the N stations and a position of a resource allocated to the $i^{th}$ station.

It should be understood that, the resource block unit may refer to a size of a smallest OFDMA sub-channel or a quantity of sub-carriers used when OFDMA is used in a current basic service set (BSS). For example, the size of the sub-channel may be 1.25 MHz, 2.5 MHz, or 5 MHz, and the quantity of the sub-carriers may be 12 data tones, 24 data tones, or 48 data tones. This is not limited in this embodiment of the present application.

Optionally, in another embodiment, a channel resource of the wireless local area network is divided into multiple resource block units, the resource allocation information of the $i^{th}$ station in the N stations includes a sub-bitmap, and each bit in the sub-bitmap represents whether a resource block unit corresponding to each bit is allocated to the $i^{th}$ station.

Optionally, in another embodiment, the resource allocation information of the $i^{th}$ station includes a start number of a resource block unit allocated to the $i^{th}$ station in the resource block units in the multiple resource block units other than the resource block units allocated to the first i−1 stations in the N stations and includes an offset relative to the start number.

Optionally, in another embodiment, the processor 1110 is configured to determine the resource allocation sequence of the N stations in descending order of quantities of resource block units allocated to the N stations, where a resource allocated to the $(i-1)^{th}$ station in the N stations is greater than or equal to a resource allocated to the $i^{th}$ station.

Optionally, in another embodiment, resource allocation information of the $i^{th}$ station includes an offset corresponding to a resource block unit allocated to the $i^{th}$ station in the resource block units in the multiple resource block units other than the resource block units allocated to the first i−1 stations in the N stations.

Optionally, in another embodiment, when resource allocation information of the $m^{th}$ station in the N stations has been already determined, and a quantity of resource block units, for which resource indication information is not determined, in the multiple resource block units is N−m, the resource allocation information of the N stations includes resource allocation information corresponding to the first m stations in the N stations, where the resource allocation information of the N stations indicates that one resource block unit is allocated to each station from the $(m+1)^{th}$ station to the $N^{th}$ station in the N stations, and 1≤m<N.

Optionally, in another embodiment, a resource allocated to the $(i-1)^{th}$ station in the N stations is greater than or equal to a resource allocated to the $i^{th}$ station.

Optionally, in another embodiment, a channel resource of the wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations.

Alternatively, in another embodiment, a channel resource of the wireless local area network is divided into multiple resource block units, and the processor 1110 is configured to: determine, according to a position of a resource allocated to the $i^{th}$ station in the N stations, a bandwidth of the resource allocated to the $i^{th}$ station in the N stations; and determine the resource allocation information according to the bandwidth of the resource allocated to the $i^{th}$ station in the N stations and a sequential position of the $i^{th}$ station in the N stations, where the resource allocation information includes the bandwidth of the resource allocated to the $i^{th}$ station and the sequential position of the $i^{th}$ station in the N stations.

Optionally, in another embodiment, a channel resource of the wireless local area network is divided into multiple resource block units, a bandwidth of a resource allocated to the $i^{th}$ station in the N stations is a quantity of resource block units allocated to the $i^{th}$ station in the N stations, and the resource allocation information includes the quantity of the resource block units allocated to the $i^{th}$ station and a sequential position of the $i^{th}$ station in the N stations, and the bandwidth of the resource allocated to the $i^{th}$ station in the N stations is the quantity of the resource block units allocated to the $i^{th}$ station in the N stations.

Optionally, in another embodiment, the processor 1110 is configured to obtain a start position or an end position of resources allocated to the N stations, where the resource allocation information further includes the start position or the end position.

Optionally, in another embodiment, when quantities of resource block units allocated to the N stations are equal, bandwidths of resources allocated to the N stations are represented by using one numerical value, the numerical value represents the quantity of the resource block units allocated to each station in the N stations, and the resource allocation information includes a sequential position of the $i^{th}$ station in the N stations and the numerical value.

Optionally, in another embodiment, the transceiver 1140 is configured to send resource block unit information to the $i^{th}$ station, where the resource block unit information indicates a size of a resource block unit.

Optionally, in another embodiment, the transceiver 1140 is configured to send the resource block unit information to the $i^{th}$ station by using one of a management frame, a data frame, or a control frame.

Alternatively, in another embodiment, the processor 1110 is configured to: determine, according to the position of the resource allocated to each station in the N stations, a start position of a resource allocated to the $i^{th}$ station in the N stations; and determine the resource allocation information according to the start position of the resource allocated to the $i^{th}$ station in the N stations and a sequential position of the $i^{th}$ station in the resource allocation sequence of the N stations, where the resource allocation information includes the start position of the resource allocated to the $i^{th}$ station and the sequential position of the $i^{th}$ station in the resource allocation sequence of the N stations.

Alternatively, in another embodiment, the processor 1110 is configured to: determine, according to the position of the resource allocated to each station in the N stations, an end position of a resource allocated to the $i^{th}$ station in the N stations; and determine the resource allocation information according to the end position of the resource allocated to the $i^{th}$ station in the N stations and a sequential position of the $i^{th}$ station in the resource allocation sequence of the N stations, where the resource allocation information includes the end position of the resource allocated to the $i^{th}$ station and the sequential position of the $i^{th}$ station in the resource allocation sequence of the N stations.

Optionally, in another embodiment, the transceiver 1140 is configured to send a data frame to the $i^{th}$ station in the N stations, where the data frame carries the resource indication information.

Figure 12:
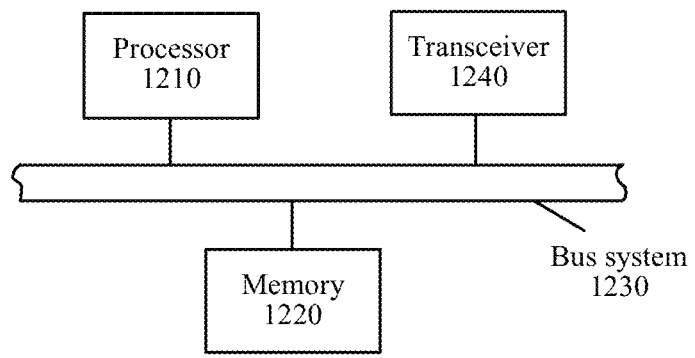
FIG. 12 is a schematic block diagram of a station according to another embodiment of the present application.

FIG. 12 is a schematic block diagram of a station according to another embodiment of the present application. A station 1200 in FIG. 12 includes a processor 1210, a memory 1220, a bus system 1230, and a transceiver 1240. The processor 1210, the memory 1220, and the transceiver 1240 are connected by using the bus system 1230.

Specifically, the transceiver 1240 is configured to receive resource indication information sent by an access point, where the resource indication information is used to indicate a resource allocation sequence of N stations and resource allocation information, and the resource allocation information is used to reflect a relative position of a resource allocated to each station in the N stations; and the processor 1210 is configured to invoke, by using the bus system 1230, code stored in the memory 1220, to determine, according to the resource indication information, a position of a resource allocated to the station, where N is greater than or equal to 2.

Therefore, in this embodiment of the present application, a station receives resource indication information that is sent by an access point and that is used to indicate a resource allocation sequence of N stations and resource allocation information, where the resource allocation information is used to reflect a relative position of a resource allocated to each station in the N stations; and the station determines, according to the resource indication information, a position of a resource allocated to the station. In this embodiment of the present application, redundancy between indication information of different stations is utilized, so that signaling overheads of the indication information can be reduced.

The method disclosed in the foregoing embodiment of the present application may be applied to the processor 1210, or may be implemented by the processor 1210. The processor 1210 may be an integrated circuit chip and has a signal processing capability. In an implementation process, steps of the foregoing methods may be accomplished by using an integrated logic circuit of hardware in the processor 1210 or an instruction in a form of software. The processor 1210 may be a general purpose processor, a digital signal processor (DSP), an application specific integrated circuit (ASIC), a field programmable gate array (FPGA), or other programmable logic devices, discrete gate or transistor logic devices, and discrete hardware components. The processor 1210 may implement or execute methods, steps and logical block diagrams disclosed in the embodiments of the present application. The general purpose processor may be a microprocessor or the processor may be any conventional processor or the like. Steps of the methods disclosed with reference to the embodiments of the present application may be directly executed and completed by a hardware decoding processor, or may be executed and completed by using a combination of hardware and software modules in the decoding processor. The software module may be located in a mature storage medium in the field, such as a random access memory (RAM), a flash memory, a read-only memory (ROM), a programmable read-only memory, an electrically-erasable programmable memory, or a register. The storage medium is located in the memory 1220, the processor 1210 reads information in the memory 1220, to implement the steps in the method with reference to the hardware. In addition to a data bus, the bus system 1230 may further include a power bus, a control bus, and a status signal bus. However, for purpose of clear description, various types of buses in the figure are all marked as the bus system 1230.

The station in FIG. 12 can implement processes involving a station in the resource allocation method in the embodiments in FIG. 6 to FIG. 10. To avoid repetition, details are not described herein again.

Alternatively, in another embodiment, a channel resource of a wireless local area network is divided into multiple resource block units, and resource allocation information of the station is used to instruct the station to obtain, according to the resource allocation information of the station, a position of a resource block unit allocated to the station, and the processor 1210 is configured to determine, according to the resource allocation information of the station, the position of the resource block unit allocated to the station.

Optionally, in another embodiment, the resource allocation information includes a sub-bitmap, each bit in the sub-bitmap represents whether a resource block unit corresponding to each bit is allocated to the station corresponding to the sub-bitmap, and the processor 1210 is configured to determine, according to the sub-bitmap of the station, a position of a resource block unit allocated to the station.

Alternatively, in another embodiment, a channel resource of a wireless local area network is divided into multiple resource block units, and the resource allocation information includes a quantity of resource block units allocated to the station and a sequential position of the station in the resource allocation sequence of the N stations, and the processor 1210 is configured to: determine, according to the resource indication information, the sequential position of the station in the resource allocation sequence of the N stations, the quantity of the resource block units allocated to the station, and a quantity of resource block units allocated to a station before the station in the N stations; and determine, according to the quantity of the resource block units allocated to the station before the station in the N stations and the quantity of the resource block units allocated to the station, a position of the resource block unit allocated to the station.

Alternatively, in another embodiment, a channel resource of a wireless local area network is divided into multiple resource block units, the resource indication information includes a bitmap, the bitmap includes N segments of consecutive bits having a same value of 0 or 1, to indicate resource block units allocated to each station in the N stations, and alternating of the consecutive bits having a same value of 0 and the consecutive bits having a same value of 1 indicates that resource block units corresponding to each segment of consecutive bits having a same value in the N segments are allocated to one of the N stations according to the resource allocation sequence of the N stations. The processor 1210 is configured to determine, according to the sequential position of the station in the resource allocation sequence of the N stations and the bitmap, the position of the resource block unit allocated to the station.

Alternatively, in another embodiment, the transceiver 1240 is configured to: receive resource block unit information sent by the access point, where the resource block unit information indicates a size of a resource block unit; and determine the size of the resource block unit according to the resource block unit information.

Optionally, in another embodiment, the transceiver 1240 is configured to receive the resource block unit information that is sent by the access point by using one of a management frame, a data frame, or a control frame.

Alternatively, in another embodiment, the resource allocation information includes a start position of a resource allocated to the station and a sequential position of the station in the resource allocation sequence of the N stations; and the processor 1210 is configured to: determine, according to the resource indication information, the sequential position of the station in the resource allocation sequence of the N stations, the start position of the resource allocated to the station, and a start position of a resource occupied by a next station of the station; and determine that a resource between the start position of the resource occupied by the next station of the station and the start position of the station is the position of the resource allocated to the station.

Alternatively, in another embodiment, the resource indication information includes an end position of a resource allocated to the station and a sequential position of the station in the resource allocation sequence of the N stations; and the processor 1210 is configured to: determine, according to the resource indication information, the sequential position of the station in the resource allocation sequence of the N stations, the end position of the resource allocated to the station, and an end position of a resource occupied by a preceding station of the station; and determine that a resource between the end position of the resource occupied by the preceding station of the station and the end position of the resource allocated to the station is the position of the resource allocated to the station.

Alternatively, in another embodiment, the resource allocation information includes an end position of the resources allocated to the N stations in the wireless local area network, a bandwidth of the resource allocated to each station in the N stations, and a sequential position of each station in the resource allocation sequence of the N stations; and the processor 1210 is configured to: determine, according to the resource allocation information, a sequential position of the station in the resource allocation sequence of the N stations, a bandwidth of a resource allocated to the station, the end position of the resources allocated to the N stations in the wireless local area network, and bandwidths of resources allocated to all stations after the station in the N stations; and determine the position of the resource allocated to the station, according to the sequential position of the station in the N stations, the bandwidth of the resource allocated to the station, the end position, and the bandwidths of the resources allocated to all the stations after the station in the N stations.

Alternatively, in another embodiment, the resource indication information includes a start position of the resources allocated to the N stations in the wireless local area network, a bandwidth of a resource allocated to each station in the N stations, and a sequential position of each station in the resource allocation sequence of the N stations; and the processor 1210 is configured to: determine, according to the resource allocation information, a sequential position of the station in the resource allocation sequence of the N stations, a bandwidth of a resource allocated to the station, the start position of the resources allocated to the N stations in the wireless local area network, and bandwidths of resources allocated to all stations before the station in the N stations; and determine the position of the resource allocated to the station, according to the sequential position of the station in the N stations, the bandwidth of the resource allocated to the station, the start position, and the bandwidths of the resources allocated to all the stations before the station in the N stations.

Optionally, in another embodiment, the first receiving unit is configured to receive a data frame sent by the access point, where the data frame carries the resource indication information.

It should be understood that "an embodiment" or "one embodiment" mentioned in this specification means that specific features, structures, or properties related to an embodiment is included in at least one embodiment of the present application. Therefore, "in an embodiment" or "in one embodiment" in the whole specification does not necessarily refer to a same embodiment. Moreover, the particular characteristic, structure, or property may be combined in one or more embodiments in any proper manner. It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what are described above are merely exemplary embodiments of the technical solutions of the present application, but are not intended to limit the protection scope of the present application. Any modification, equivalent replacement, or improvement made without departing from the spirit and principle of the present application shall fall within the protection scope of the present application.

What is claimed is:

1. An access point, comprising:
a memory; and
a processor coupled to the memory and configured to:
determine resource allocation information according to a resource allocation sequence of N stations and a position of the resource allocated to each station in the N stations, wherein the resource allocation information is used to reflect a position of the resource allocated to each station in the N stations relative to a first station of the N stations; and
send resource indication information, so that each station in the N stations obtains, according to the resource indication information, the position of the resource allocated to each station relative to the first station of the N stations, wherein the resource indication information is used to indicate the resource allocation sequence of the N stations and the resource allocation information, and N is greater than or equal to 2,
wherein a channel resource of a wireless local area network is divided into multiple resource block units, and
the processor is further configured to:
re-number resource block units in the multiple resource block units excluding resource block units allocated to first i−1 stations in the N stations, wherein 2≤i<N; and
determine resource allocation information of an $i^{th}$ station according to numbers of the resource block units in the multiple resource block units excluding the resource block units allocated to the first i−1 stations in the N stations and a position of a resource allocated to the $i^{th}$ station.

2. The access point according to claim 1, wherein the resource allocation information of the $i^{th}$ station in the N stations comprises a sub-bitmap, and each bit in the sub-bitmap represents whether a resource block unit corresponding to each bit is allocated to the $i^{th}$ station.

3. The access point according to claim 1, wherein the resource allocation information of the $i^{th}$ station comprises a start number of a resource block unit allocated to the $i^{th}$ station in the resource block units in the multiple resource block units excluding the resource block units allocated to the first i−1 stations in the N stations and comprises an offset relative to the start number.

4. A station, comprising:
a memory; and
a processor coupled to the memory and configured to:
receive resource allocation information sent by an access point, wherein the resource allocation information is used to indicate a resource allocation sequence of N stations and resource allocation information, the resource allocation information is used to reflect a position of a resource allocated to each station in the N stations relative to a first station of the N stations, and N is greater than or equal to 2; and
determine, according to the resource allocation information, a position of a resource allocated to the station,
wherein a channel resource of the wireless local area network is divided into multiple resource block units, and
wherein the resource allocation information of the $i^{th}$ station in the N stations comprises a start number of a resource block unit allocated to the $i^{th}$ station in the resource block units in the multiple resource block units other than the resource block units allocated to the first i−1 stations in the N stations and comprises an offset relative to the start number.

5. The station according to claim 4, wherein resource allocation information of the station is used to instruct the station to obtain, according to the resource allocation information of the station, a position of a resource block unit allocated to the station, and
determine, according to the resource allocation information of the station, the position of the resource block unit allocated to the station.

6. The station according to claim 5, wherein the resource allocation information comprises a sub-bitmap, and each bit in the sub-bitmap represents whether a resource block unit corresponding to each bit is allocated to the station corresponding to the sub-bitmap, and
the processor is further configured to determine, according to the sub-bitmap of the station, the position of the resource block unit allocated to the station.

7. A resource allocation method in a wireless local area network, comprising:
- determining resource allocation information according to a resource allocation sequence of N stations and a position of the resource allocated to each station in the N stations, wherein the resource allocation information is used to reflect a position of the resource allocated to each station in the N stations relative to a first station of the N stations; and
- sending resource indication information, so that each station in the N stations obtains, according to the resource indication information, the position of the resource allocated to each station relative to the first station of the N stations, wherein the resource indication information is used to indicate the resource allocation sequence of the N stations and the resource allocation information, and N is greater than or equal to 2,
- wherein a channel resource of the wireless local area network is divided into multiple resource block units, and the determining resource allocation information according to the resource allocation sequence of the N stations and the position of the resource allocated to each station in the N stations comprises:
- re-numbering resource block units in the multiple resource block units excluding resource block units allocated to first i−1 stations in the N stations, wherein 2≤i<N; and
- determining resource allocation information of an $i^{th}$ station according to numbers of the resource block units in the multiple resource block units excluding the resource block units allocated to the first i−1 stations in the N stations and a position of a resource allocated to the $i^{th}$ station.

8. The method according to claim 7, wherein the resource allocation information of the $i^{th}$ station in the N stations comprises a sub-bitmap, and each bit in the sub-bitmap represents whether a resource block unit corresponding to each bit is allocated to the $i^{th}$ station.

9. The method according to claim 7, wherein the resource allocation information of the $i^{th}$ station comprises a start number of a resource block unit allocated to the $i^{th}$ station in the resource block units in the multiple resource block units other than the resource block units allocated to the first i−1 stations in the N stations and comprises an offset relative to the start number.

10. A resource allocation method in a wireless local area network, comprising:
- receiving, by a station, resource allocation information sent by an access point, wherein the resource allocation information is used to indicate a resource allocation sequence of N stations and resource allocation information, the resource allocation information is used to reflect a position of a resource allocated to each station in the N stations relative to a first station of the N stations, and N is greater than or equal to 2; and
- determining, by the station according to the resource allocation information, a position of a resource allocated to the station,
- wherein a channel resource of the wireless local area network is divided into multiple resource block units, and
- wherein the resource allocation information of the $i^{th}$ station in the N stations comprises a start number of a resource block unit allocated to the $i^{th}$ station in the resource block units in the multiple resource block units other than the resource block units allocated to the first i−1 stations in the N stations and comprises an offset relative to the start number.

11. The method according to claim 10, wherein resource allocation information of the station is used to instruct the station to obtain, according to the resource allocation information of the station, a position of a resource block unit allocated to the station, and
- the determining, by the station according to the resource allocation information, a position of a resource allocated to the station comprises:
- determining, by the station according to the resource allocation information of the station, the position of the resource block unit allocated to the station.

12. The method according to claim 11, wherein the resource allocation information comprises a sub-bitmap, and each bit in the sub-bitmap represents whether a resource block unit corresponding to each bit is allocated to the station corresponding to the sub-bitmap, and
- the determining, by the station according to the resource allocation information, a position of a resource allocated to the station comprises:
- determining, by the station according to the sub-bitmap of the station, the position of the resource block unit allocated to the station.

* * * * *

UNITED STATES PATENT AND TRADEMARK OFFICE
CERTIFICATE OF CORRECTION

PATENT NO. : 10,397,901 B2  
APPLICATION NO. : 15/443373  
DATED : August 27, 2019  
INVENTOR(S) : Weimin Wu et al.

Page 1 of 1

It is certified that error appears in the above-identified patent and that said Letters Patent is hereby corrected as shown below:

On the Title Page

Item (72), In Inventor information, delete "Jun Lou," and insert -- Jun Luo --, therefor.

Signed and Sealed this  
Twenty-first Day of January, 2020

Andrei Iancu  
*Director of the United States Patent and Trademark Office*